US009495062B1

(12) United States Patent (10) Patent No.: US 9,495,062 B1
Reiner et al. (45) Date of Patent: Nov. 15, 2016

(54) SYSTEMS AND METHODS FOR IT SERVICES AND SOCIAL KNOWLEDGE MANAGEMENT USING PERSPECTIVES

(71) Applicant: ITinvolve, Inc., Houston, TX (US)

(72) Inventors: Rob Reiner, Cypress, TX (US); Michael Sharpe, Katy, TX (US)

(73) Assignee: ITINVOLVE, INC., Houston, TX (US)

( * ) Notice: Subject to any disclaimer, the term of this patent is extended or adjusted under 35 U.S.C. 154(b) by 239 days.

(21) Appl. No.: 13/929,466

(22) Filed: Jun. 27, 2013

Related U.S. Application Data

(60) Provisional application No. 61/665,812, filed on Jun. 28, 2012, provisional application No. 61/673,179, filed on Jul. 18, 2012.

(51) Int. Cl.
*G06F 3/0481* (2013.01)

(52) U.S. Cl.
CPC .................................. *G06F 3/0481* (2013.01)

(58) Field of Classification Search
CPC ...................................................... G06F 3/0481
USPC ......................................................... 715/744
See application file for complete search history.

(56) References Cited

U.S. PATENT DOCUMENTS

| | | | | |
|---|---|---|---|---|
| 5,787,252 | A * | 7/1998 | Schettler | 709/224 |
| 5,821,937 | A * | 10/1998 | Tonelli | 715/853 |
| 5,948,055 | A * | 9/1999 | Pulsipher | 709/202 |
| 6,421,719 | B1 * | 7/2002 | Lewis | 709/224 |
| 8,769,084 | B2 * | 7/2014 | Westerfeld | 709/224 |
| 8,782,218 | B1 * | 7/2014 | Graham | 709/224 |
| 2002/0116516 | A1 * | 8/2002 | Pedersen | G06F 3/011 709/231 |
| 2004/0128321 | A1 * | 7/2004 | Hamer | G06Q 10/10 |
| 2013/0227113 | A1 * | 8/2013 | Baras | 709/224 |

OTHER PUBLICATIONS

Book—Social IT, ServiceNow, available at http://wiki.servicenow.com/index.php?title=Book:Social_IT (modified Jul. 27, 2011).*
UCSF ServiceNow User Guide, University of California—San Francisco, available at https://it.ucsf.edu/sites/it.ucsf.edu/files/servicenow_user_guide_v2.6_r02.10.12.pdf (Feb. 10, 2012).*
Singleton, Derek, The Benefits of Activity Streams in Manufacturing UIs, Software Advice, available at http://blog.softwareadvice.com/articles/manufacturing/the-benefits-of-activity-streams-in-manufacturing-uis-101012/ (Jan. 2, 2012).*

(Continued)

*Primary Examiner* — Doon Chow
*Assistant Examiner* — Conrad Pack
(74) *Attorney, Agent, or Firm* — Sprinkle IP Law Group

(57) ABSTRACT

A perspective management system configured for providing a perspective editor through which users in the IT environment can build perspectives. A perspective specifies a set of IT objects representing a portion of the IT environment that a user or a group of users care about. The perspective management system implements a social networking paradigm. As such, each IT object has an activity stream configured for capturing communications, notifications, and knowledge related to the IT object. Perspectives are themselves IT objects. Therefore, each perspective also has an activity stream. In response to a request from a client device such as for an impact analysis on a change, an incident, or a problem, the system constructs a graphical view for display on the client device showing a potential impact on objects in one or more of the perspectives involved.

20 Claims, 21 Drawing Sheets

(56) References Cited

OTHER PUBLICATIONS

All, Ann, Making the IT Service Desk a More Social Place, Enterprise Apps Today, available at http://www.enterpriseappstoday.com/management-software/making-it-service-desk-social-place-ITSM.html (Jun. 1, 2012).*

Book—ITIL Change Implementation, ServiceNow, available at http://wiki.servicenow.com/index.php?title=Book:Social_IT, excerpted through "Defining a Workflow" (modified Nov. 28, 2011).*

Enterprise CMBD, ServiceNow, available at http://wiki.servicenow.com/index.php?title=Enterprise_CMDB&oldid=80213 (modified May. 23, 2011).*

ITIL Configuration Management, ServiceNow, available at http://wiki.servicenow.com/index.php?title=ITIL_Configuration_Management&oldid=76557 (modified Mar. 30, 2011).*

Live feed interaction with CMDB, ServiceNow—Community, available at https://community.servicenow.com/thread/152891 (posted Jun. 1, 2012).*

Suggested Relationships, ServiceNow, available at http://wiki.servicenow.com/index.php?title=Suggested_Relationships&oldid=86581 (modified Aug. 18, 2011).*

Book—Introduction to ServiceNow Part 1, ServiceNow, available at http://wiki.servicenow.com/index.php?title=Book:Introduction_to_ServiceNow_Part_1&oldid=91852, excerpted through "Navigating Applications" (book list modified Oct. 18, 2011).*

Book—ITIL Implementation Guide, ServiceNow, available at http://wiki.servicenow.com/index.php?title=Book:ITIL_Implementation_Guide&oldid=82218, excerpted through "Release Management" (book list modified Jun. 10, 2011).*

\* cited by examiner

Jeff Baxter Objects added to perspective Finale: Finale_Historical(Database), TXESX023(Computer),Finale_Reporting(Database),TXESX017(Computer),TXHOU-DC-NET-SW-RD03(Network Device),TXHOU-DC-NET-SW-RD05(Network Device),TXHOU-DC-NET-SW-RD04(Network Device),Finale_CurrentYear(Database), Finale(Database Instance)

April 12, 2012 at 12:52 PM  Involve · Comment · Like

Finale_Historical
    TXESX023
    Finale_Reporting
    TXESX017
    TXHOU-DC-NET-SW-RD03
    TXHOU-DC-NET-SW-RD05
    TXHOU-DC-NET-SW-RD04
    Finale_CurrentYear
    Finale Jeff Baxter Objects added to perspective Finale: Finale_Databases(Application), TXFINALECON02(Computer),TXUIFINALE(Application Server),TXWEBFINALE (Computer),TXFINALECON03(Computer),TXFINALECON01(Computer), TXESX032(Computer),TXWEBFINALE-IIS(Application

FIG. 9B

FROM FIG. 9A

Exchange Perspective —1301
Exchange Sample

1350

| Perspective Details | Activity Stream | Perspective | SLAs |

💬 Post  ▢ File  🔗 Link  📊 Poll                    Followers  Show All (3)

[Write something...]    [Share]   👤👤👤

---

Sort by: Post Date ▾

Rob Robert
Objects added to perspective Exchange: Exchange Team (IT Group)
  🎗 Involve • Comment • Like • February 6, 2013 at 3:28 PM
Exchange Team

---

Rob Robert
Objects added to perspective Exchange: ITilS-PCI-Vulnerablilty Management (Knowledge)
  🎗 Involve • Comment • Like • February 4, 2013 at 10:57 AM
ITilS-PCI-Vulnerability Management

---

Rob Robert
Objects removed from perspective Exchange: 2-03 Security Policy(Policy)
  🎗 Involve • Comment • Like • February 4, 2013 at 10:57 AM
2-03 Security Policy

---

> Rob Robert
> Objects removed from perspective Exchange: CAMRYMSGSWP01(Network Device)
>   🎗 Involve • Comment • Like • December 5, 2013 at 11:02 AM
> CAMRYMSGSWP01
>
> > Andy App Admin
> > Rob - I'm seeing this error message since you did that
> >   Mobile upload from Steve Storage at 12/5/12, 1:51 PM
> >   Download jpg (5.2 MB) • More Actions ▾      ←—1351
> >
> > Like • December 5, 2012 at 1:55 PM via Chatter for iOS
> > [Write a comment...]

---

Rob Robert
Objects added to perspective Exchange: 2-03 Security Policy(Policy)
  🎗 Involve • Comment • Like • September 25, 2012 at 6:17 PM
2-03 Security Policy

SYSTEMS AND METHODS FOR IT SERVICES AND SOCIAL KNOWLEDGE MANAGEMENT USING PERSPECTIVES

CROSS-REFERENCE TO RELATED APPLICATIONS

This is a conversion of and claims a benefit of priority from U.S. Provisional Application No. 61/665,812, filed Jun. 28, 2012, entitled "SYSTEM AND METHOD FOR IT CONFIGURATION MANAGEMENT USING OBJECT PERSPECTIVES" and U.S. Provisional Application No. 61/673,179, filed Jul. 18, 2012, entitled "SYSTEM AND METHOD FOR IT CONFIGURATION MANAGEMENT USING OBJECT PERSPECTIVES." This application relates to U.S. patent application Ser. No. 13/928,866, filed concurrently herewith, entitled, "SYSTEMS AND METHODS FOR IT SERVICES AND SOCIAL KNOWLEDGE MANAGEMENT USING SOCIAL OBJECTS AND ACTIVITY STREAMS," which is a conversion of and claims a benefit of priority from U.S. Provisional Application No. 61/665,691, filed Jun. 28, 2012, entitled "SYSTEM AND METHOD FOR IT CONFIGURATION MANAGEMENT USING SOCIAL METHODOLOGIES" and U.S. Provisional Application No. 61/673,171, filed Jul. 18, 2012, entitled "SYSTEM AND METHOD FOR IT CONFIGURATION MANAGEMENT USING SOCIAL METHODOLOGIES." This application also relates to U.S. patent application Ser. No. 13/753,799, filed Jan. 30, 2013, entitled "SYSTEMS AND METHODS FOR IT SERVICES AND SOCIAL KNOWLEDGE MANAGEMENT USING CHANNELS." All applications listed in this paragraph are fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

The invention relates generally to information technology (IT) management, and more particularly to the organization of groups of objects in an IT environment and the use of social methodologies with respect to the groups of IT objects to facilitate and improve such activities as change management, IT task organization, IT reporting, and the like.

BACKGROUND

IT environments generally encompass many objects that are related to each other in some manner. These objects may correspond to both physical entities such as computers and virtual entities such as databases. Managing the objects and their relationships to each other is critical to the smooth operation of any IT environment.

Conventional IT management practices are subject to a number of problems that are common to a wide variety of IT environments. For example, most IT management systems have some store of IT objects that the IT department is responsible for. This store may be a flat file, a simple comma-separated-value (CSV) file, a database, a configuration management database (CMDB), an asset management system, or a combination thereof. These stores typically contain data that represents everything in the IT environment. This may include a vast amount of data that can be overwhelming to users, and may make it difficult for users to focus the data that is relevant to their everyday tasks, or to specific problems that may involve only a small subset of the IT environment.

Some systems provide means to visualize or extract information from the data that is in the data store. Fewer systems allow relationships between specific objects within the IT environment to be defined. Those systems that do allow relationships to be defined typically include all of the available data and consequently result in a huge graph of objects. Again, the large amount of information that is presented to the user may be overwhelming, and consequently of little value to the user.

Some systems attempt to provide higher-level features around such graphs. For example, some products provide mechanisms to traverse the graphs graphically. Others use the data in the graph to attempt to perform root cause analysis, impact analysis, dependency analysis, or other types of analysis of the data. Because these features are based on the entirety of the available data, however, it may be difficult for the user to identify the portion of the data or the corresponding analysis that is meaningful. In other words, the user may not be able to identify the meaningful information in the midst of the "noise" of the meaningless information.

This problem may in turn cause the value of the data in the data store to degrade. Because many of the objects in the data store are simply not relevant to most administrators most of the time, there may be no meaningful way to partition responsibility for these objects. As a result, no particular administrator may have an interest in updating these objects, and their information may become out-of-date. Further, when devices go out of service, administrators frequently fail to update the data store, and instead simply ignore that object if it shows up in results derived from the store. Administrators may in some instances have to remember knowledge about the states of objects because there is no means to record this knowledge in the data store. In a relatively short period of time, the data in the store age, becomes out-of-date and untrustworthy, and effectively serve no purpose other than to obscure other, meaningful data.

It would therefore be desirable to provide a mechanism that encourages users, including administrative staff, stakeholders and end users who own, administer, manage and rely on IT objects to maintain data in the data store in a cost effective manner.

SUMMARY OF THE DISCLOSURE

Embodiments disclosed herein provide systems and methods for information technology (IT) services and social knowledge management using perspectives. The system may include various social features realized through IT objects. IT objects are social objects configured to represent physical (including animate and non-animate objects) and non-physical objects in the IT environment. Social objects are special software objects implementing a social paradigm. Each IT object represents a corresponding physical or non-physical thing, object, item, element, or entity in the IT environment and each IT object has an activity stream for capturing communications, notifications, and knowledge related to the IT object. IT objects may be stored in a data storage device communicatively connected to the system running on one or more server machines.

The system may include a perspective management system configured for providing a perspective editor through which users in the IT environment can build perspectives. Each perspective defines a set of IT objects representing a portion of the IT environment that is of interest to a group or one of the users. Since these perspectives are themselves IT objects, each perspective has an activity stream configured for capturing communications, notifications, and knowledge related to the perspective.

The perspectives can be viewed in many graphical forms. For example, in response to an impact analysis request, the system may construct a graphical view such as a Venn diagram for display on a client device showing a potential impact of a change, an incident, or a problem on objects in one or more of the perspectives. A single IT object may be included in more than one perspective. Thus, some perspectives may overlap.

When a perspective or an object contained therein is changed, their associated activity stream(s) is/are updated automatically and instantaneously to reflect the change. The change to the perspective may be triggered by a relationship rule applied to a specific part of the perspective, by removal of an object from the perspective, or by addition of an object to the perspective. Other events may also trigger updates being made to the activity streams of the perspective and of the objects in the perspective.

Perspectives can be built in many ways. For example, a perspective can be built using a relationship based search in which all objects within a certain degree of a selected object are searched. A function is invoked to create a perspective using the resulting set of objects from the search. As another example, a perspective can be built using a perspective editor which allows a user to start with an empty perspective and then search for objects and relationships that can be pulled into the perspective. Alternatively, a perspective can be built by cloning an existing perspective into a new one and then adding objects and relationships to it, or remove them from it. As yet another example, a perspective can be built using an object browser which is a graphical way of exploring all objects and relationships in the system. The object browser allows a user to start from a specific object and then start exploring from that object via the relationships that object has with other objects. From each object in the object browser, specific relationships can be traversed and the objects at the other end of the relationship can be added to a view in the object browser. Once the user is happy with the objects in the view, a function can be invoked to add all the explored objects in the current view to a new perspective.

Embodiments can be implemented as hardware, software programming or some combination. Embodiments can be implemented as computer instructions stored on any appropriate non-transitory computer readable medium known in the art.

Embodiments can provide many advantages. For example, an activity stream of a perspective can include messages, notifications of events, or other relevant information that is communicated between users or generated by the system in relation to the perspective. The activity stream enables communication to and among stakeholders as to the perspective itself or objects and relationships within the perspective). The activity stream enables the sharing of relevant information with interested stakeholders while at the same time eliminating extraneous "noise" or unrelated discussions. Although the perspective may be owned and designed by a particular user, other stakeholders can contribute information to the perspective and its objects, thereby increasing the amount of available information.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 9A-9B depict diagrammatic representations of an example user interface showing an activity stream associated with a perspective in an IT environment;

FIGS. 10A-10B depict diagrammatic representations of an example user interface showing a map of multiple overlapping perspectives and the objects and relationships therein;

FIGS. 15A-15B depicts a diagrammatic representation of an example user interface showing a view of an example change object;

FIGS. 17A-17B depict an example showing that a change to a perspective concerning an IT object is reflected in both the perspective's activity stream and the IT object's activity stream.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments of an IT management solution disclosed herein include social-media style collaboration features. Through the use of social-media style collaboration and timely and focused communication, people can more effectively and efficiently work together to solve the issues at hand and/or keep abreast of the issues they are involved in.

Before going into specific aspects of the invention, it may be helpful to have a broad understanding of the invention, including a computing environment in which the invention can be implemented.

Figure 1:
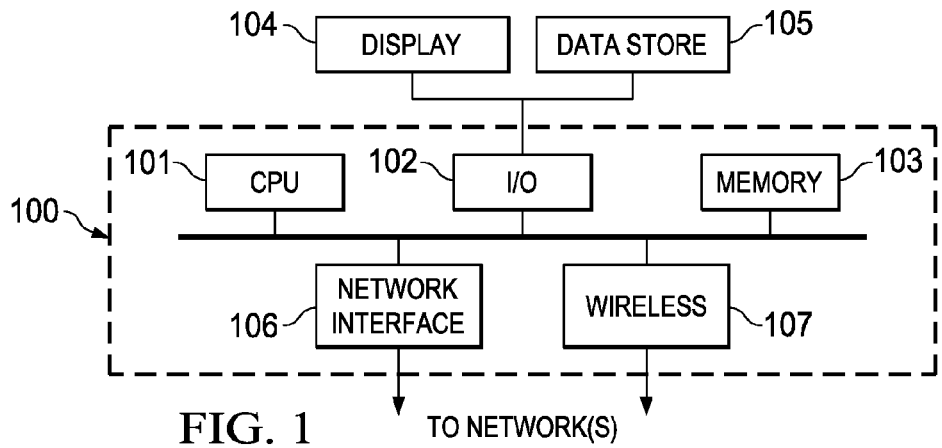
FIG. 1 depicts a functional block diagram of a computing environment in which one embodiment disclosed herein can be implemented.

Referring to FIG. 1, an example computing environment in which the invention can be implemented is shown. As shown in FIG. 1, an example embodiment may employ a computer 100, such as a personal computer or workstation. Computer 100 has one or more processors 101 coupled to one or more user input/output devices 102 (e.g., keyboard and display) and memory devices 103 (e.g., magnetic disk drives, optical disk drives, magnetic cassettes, tape drives, flash memory cards, RAMs, ROMs, smart cards, etc.). The computer can be coupled to a display 104, a data storage device 105 and various peripheral devices 104, such as printers, plotters, speakers, etc. through input/output device 102. The computer may also be coupled to external computers or other devices through a network connection 106, a wireless transceiver 107, or other means that is coupled to a network such as a local area network (LAN), wide area network (WAN), or the Internet.

Those skilled in the relevant art will appreciate that the technology can be implemented or practiced with other computer system configurations, including without limitation multi-processor systems, network PCs, mini-computers, mainframe computers, data processors, and the like. The technology can be embodied in a general purpose computer, or a special purpose computer or data processor that is specifically programmed, configured, or constructed to perform the functions described in detail herein. The technology can also be employed in distributed computing environments, where tasks or modules are performed by remote processing devices, which are linked through a communications network, e.g., a Local Area Network ("LAN"), Wide Area Network ("WAN"), or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the technology may reside on a server computer, while corresponding portions reside on a client computer.

Figure 2:
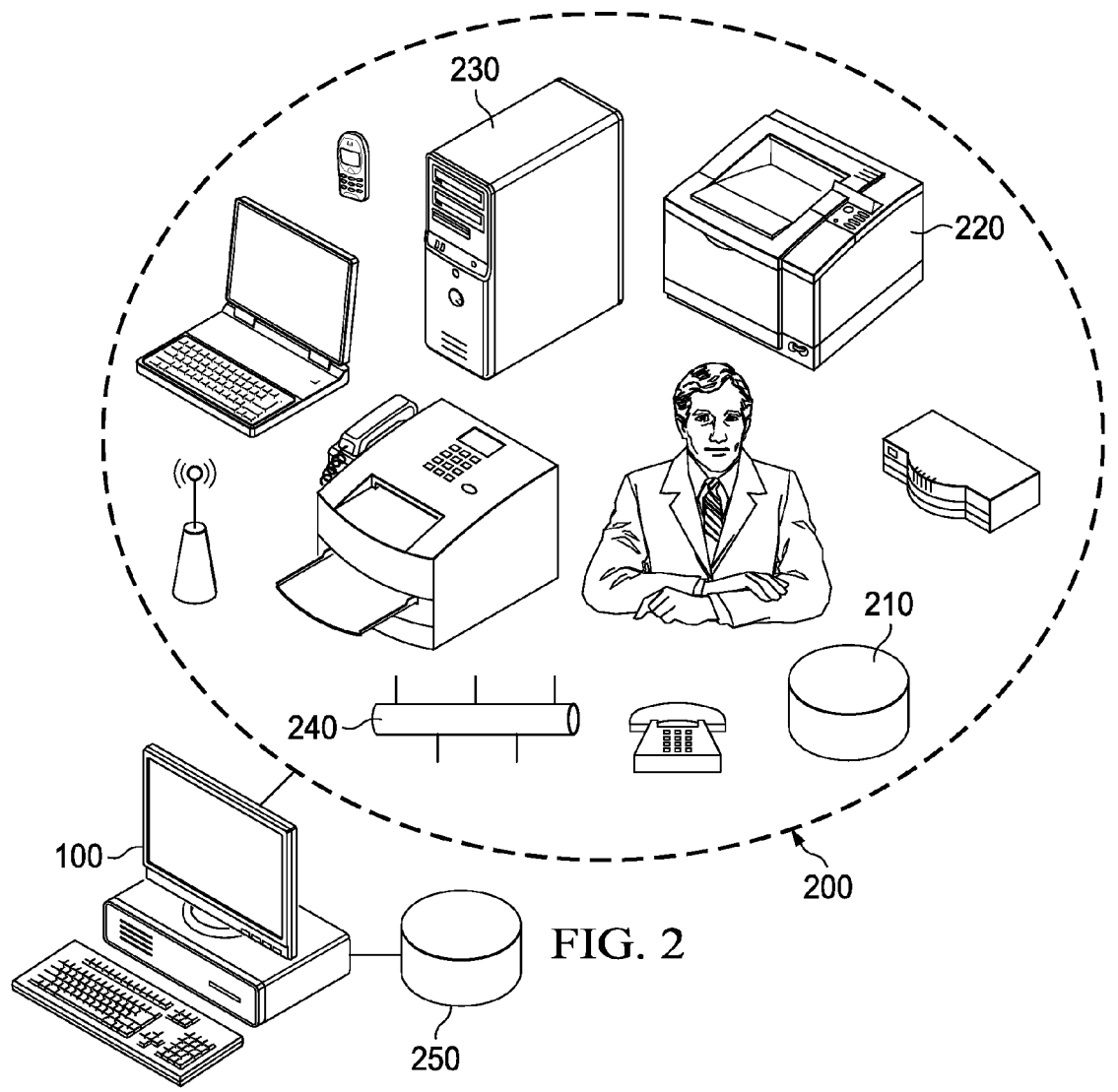
FIG. 2 depicts a diagram illustrating an IT environment.

Referring to FIG. 2, a diagram illustrating an IT environment is shown. In this embodiment, computer 100 resides in IT environment 200, although in other embodiments, computer 100 may be separate from IT environment 200. Computer 100 may be coupled to a variety of other devices in IT environment 200, such as a data storage device 210, a printer 220, a firewall 230, an Ethernet network 240, and other devices. Computer 100 may be coupled to these devices directly or indirectly, physically, logically or through other associations. There may be many other devices within IT environment 200 that are not coupled to computer 100, or the associations between them may be much more distant. IT environment 200 includes a variety of different objects. The objects may include physical objects such as computers, printers, data storage units, and the like, and activities, such as incidents and changes. IT environment 200 may also include non-physical objects, such as permissions, databases, and virtual machines and so on. Such non-physical objects in an IT environment may be referred to as IT objects, which are described in detail below.

In the example of FIG. 2, computer 100 is coupled to a data storage device 250 that is coupled to the computer; either directly or through a network or other suitable data interconnect. Computer 100 and data storage device 250 may be separate from, or contained in IT environment 200. Computer 100 can be configured to execute an IT services and social knowledge management application implementing an IT services and social knowledge management system (referred to hereinafter as the "system" for the sake of brevity). The IT services and social knowledge management application includes program instructions that cause the computer to perform functions that implement a social paradigm. These functions involve, among other things, storage of information associated with objects in the IT environment in the data storage device, as well as retrieval of the stored information. The system running on computer 100 can be configured to enable communications and collaborations (including in-context collaborations, explained below) amongst users in IT environment 200 to facilitate capture of all objects (including physical and non-physical, animate and non-animate items, things, entities, elements, etc.) and relevant information in IT environment 200, and to provide users with a much more complete, up-to-date, and easily accessible picture of the IT environment and all of the objects contained therein. It should be noted that computer 100 and the data storage device coupled thereto may have any suitable configuration or topology, and may be distinct from or encompassed by the IT environment which is being managed.

Figure 3:
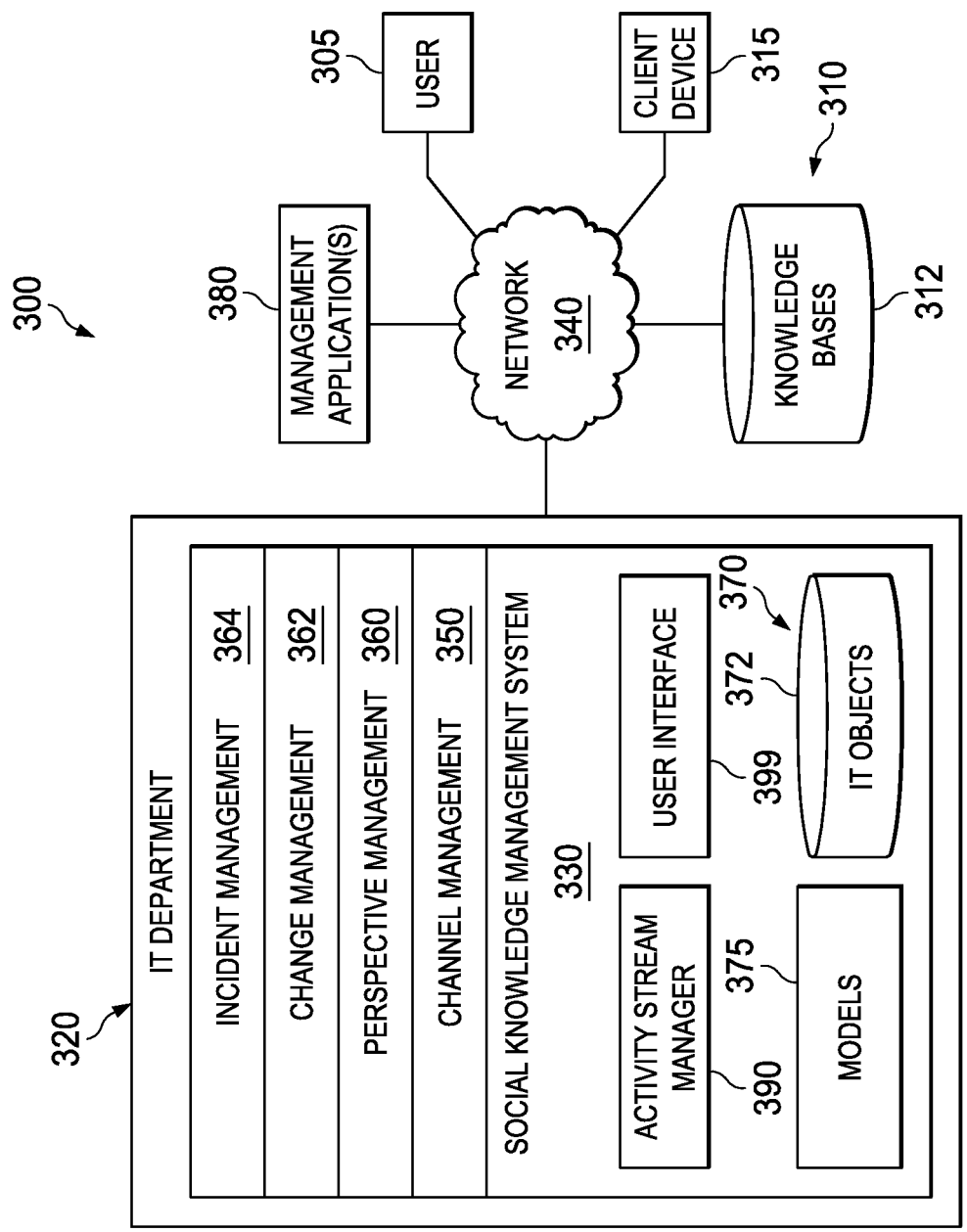
FIG. 3 depicts one embodiment of a system implementing a social paradigm for managing an IT environment.

FIG. 3 depicts one embodiment of a system implementing a social paradigm for managing IT environment 300. IT environment 200 described above can be an example of IT environment 300. In this example, IT environment 300 includes IT department 320 for servicing objects in IT environment 300. As discussed above, in this disclosure, objects in an IT environment can include physical objects (e.g., user 305, data storage device 310, client device 315, etc.) and non-physical objects (e.g., knowledge bases 312, etc.). To this end, IT department 320 may include IT services and social knowledge management system 330 (system 330 hereinafter) having activity stream manager 390 and user interface 399. System 330 may run on one or more computers. Computer 100 described above with reference to FIG. 2 can be an example of a suitable computer.

In this disclosure, "IT services and social knowledge management" broadly covers all aspects of IT operations in an IT environment. For example, system 330 may be configured for the configuration and management of IT objects 372 stored in storage device 370. IT objects 372 may represent physical (including animate and non-animate objects) and non-physical (virtual/digital) objects. Further, system 330 may be configured to perform a plurality of IT management functions (e.g., channel management 350, perspective management 360, change management 362, incident/problem management 364, etc.). A user in IT environment 300 may have access to some or all of the plurality of IT management functions over network 340 via an instance of user interface 399 running on a client device (e.g., client device 315). Ethernet network 240 described above can be an example of network 340.

Figure 4:
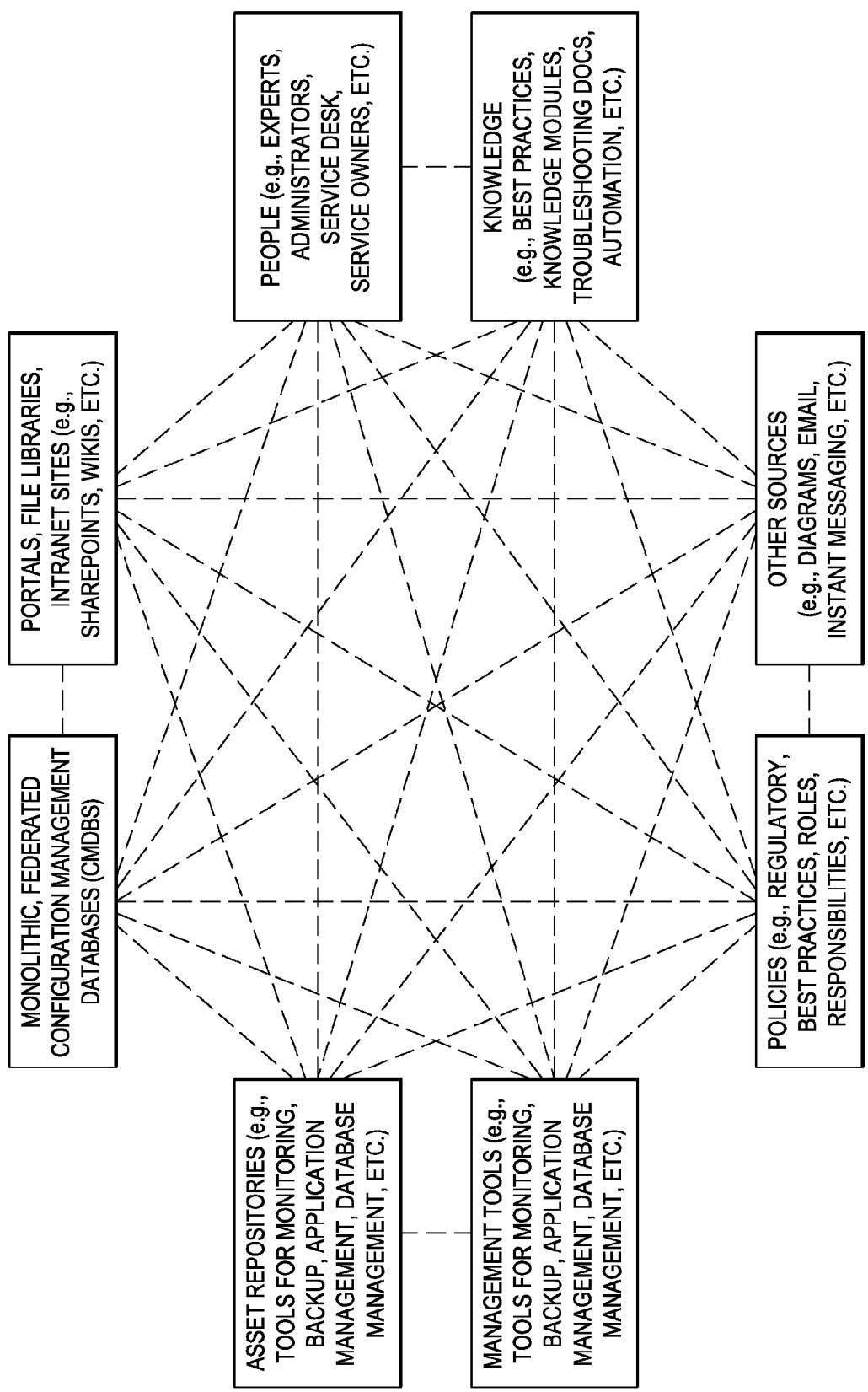
FIG. 4 depicts by example many different types of relationships among different kinds of objects in an IT environment.

Such IT management functions may be implemented on top of or as a part of system 330. Those skilled in the art will appreciate that, although not shown in FIG. 3, additional IT management functions can be created and configured to leverage the features of and advantages provided by system 330. Such advantages can be appreciated with an understanding of the scale, complexity, and challenges involved in IT operations. For example, as illustrated in FIG. 4, an object in an IT environment can have many different types of relationships with many different kinds of objects. It can be very complex and extremely difficult to pinpoint exactly what objects and/or relationships matter to a user or an issue at hand.

Embodiments of a system disclosed herein enables a "divide and conquer" based entry of object information. More specifically, instead of requiring a team of data entry personal to enter an environment's information into a configuration management database (CMDB), actual object owners and other stakeholders who have specific interests in the objects are encouraged to enter and update information about objects that affect their duties. This can eliminate or otherwise reduce entry of data that is wrong, that may be out of date by the time the entry effort is finished, and/or that may go stale very quickly.

The system disclosed herein is unique in several ways. For instance, scenarios are completely new in the field of IT management. A company may have their own internal processes that might already be in place utilizing a conventional CMDB. However, part of the problem of a conventional CMDB is that they may not have the ability to understand the root cause of an incident, the impact of a change to their IT environment, etc. To this end, the system may provide scenarios in conjunction with perspectives (explained below) to enable modeling of a particular group of objects (e.g., models 375). This allows a user of the system to play with what-if scenarios utilizing their internal processes already in place. For example, the user may wish to know "what if a change is made to an exchange email server?" Utilizing perspectives, the system can present to the user all the applications that depend on the exchange email server and show, based on the perspectives, what would happen if that change is made to the exchange email server. Aspects and examples of perspectives are explained in detail below.

Furthermore, the system has a highly "social" focus around each distinct object in an environment and can capture and make use of social knowledge about the object. This is accomplished through the use of what are referred to herein as social objects. Social objects are non-physical objects designed and configured to enable the implementation of social networking paradigms which facilitate the entry and updating of relevant information, as well as the delivery of this information to users who need the information in an efficient, effective, and timely manner.

IT objects are a type of social objects that have features which enable the use of social methodologies in an IT environment. Those skilled in the art will appreciate that other types of social objects may be implemented for different environments and applications, allowing non-animated objects to have relationships and communicate with people, if so desired.

Figure 5:
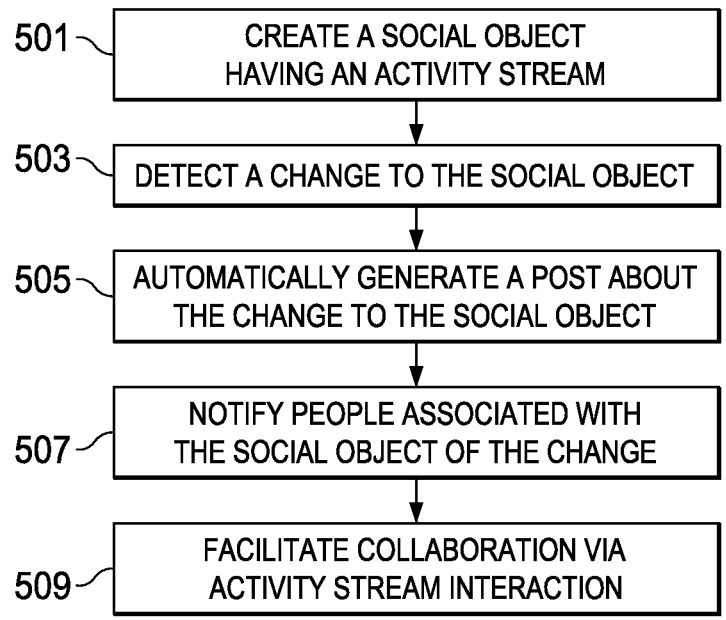
FIG. 5 depicts a flow diagram of one example of an IT services and social knowledge management method implementing a social paradigm.

One distinct social feature of a social object is referred to herein as an "activity stream" which, in one embodiment, can be a relational database object. Referring to FIG. 5, when a social object is created, an activity stream is created by the underlying system (step 501). When a change is made to the social object, the system may detect this change (step 503) and automatically generate a post about such a change (step 505). The post is placed in the activity stream and anyone who follows the social object would be notified about the post and/or the change (step 507). They can then collaborate in the context of the change to the social object by posting to the activity stream of the social object and/or commenting on the post about the change via the activity stream of the social object (step 509). Specifically, a user associated with the social object may be notified of the change via an e-mail, instant message, etc. The user may access the social object (via a user interface of the system), select and view the activity stream of the social object, and comment on the post. Since the activity stream is continuously updated in real time, this allows whoever having a direct relationship with the social object to, if necessary, collaborate on the change almost instantaneously. As explained below, a user can choose to be notified based on the type of the change. For example, a user may not want to be notified if a change to the social object is of an administrative nature and does not require collaboration. This allows the user to filter out changes that are of no or little interest (noises) to the user.

In some embodiments, at least some of the steps described above may be performed by an activity stream manager of the system. In some embodiments, the social object may be an IT object in IT environment 300 and at least some of the steps described above may be performed by activity manager 390 of system 330 shown in FIG. 3. In some embodiments, an activity stream manager may be configured to manage at least the following types of interactions:

user manipulation of the activity stream;
automatic field tracking of specific IT objects; and
automatic cross posting of specific events.

In some embodiments, the activity stream manager may be further configured to manage follower notifications and access to activity streams. The activity stream manager may utilize internal object types to store metadata that the activity stream manager needs to function. More specifically, whenever a user follows an IT object, a user-to-object activity stream mapping is created. These mappings are stored in an internal database table. Whenever an activity stream is updated by a post or a comment to a post, its followers are notified (e.g., via email or desktop client notifications, depending upon each user's notification preferences.). Viewing of an activity stream can be done in many ways, including using a user interface, a desktop client, or a mobile client of the system. Since all the posts are already created and associated with appropriate activity streams, viewing is a straightforward process of querying for the posts and comments and rendering them accordingly via the user interface, desktop client, or mobile client of the system.

In some embodiments, on a per object type basis, fields can be marked as significant. When such a field is changed, the activity stream manager creates a post about the change and posts it to the IT object's activity stream. In some embodiments, there can also be a cross-object-mapping which indicates which significant fields are significant to other IT objects also (e.g., an Incident's status is of significance to the Incident's channel, too.). The activity stream manager will generate a post for each significant field change based on the cross-object-mapping. Both the track fields per object type and cross-post-mapping can be internal objects in a relational database.

As an example, in some embodiments, an activity stream manager may implement the following algorithm:

Wait for an object's field to change
  if (field is tracked) then
  generate post to an activity stream of the object
    if (field is in cross-object-mapping) then
    generate posts on activity streams of other objects based on mapping
  Done
Done In an IT implementation, each IT object has features that encourage and reward collaboration, and these social features are centered on the IT objects, rather than the people who use the system. Another unique feature is that the system can capture all objects which are part of the IT environment, rather than only the physical devices that are present. These objects include physical, virtual and various other objects that surround and support conventional objects which generally are limited to physical devices. In one embodiment, IT objects representing objects that are part of the IT environment are stored in a data storage device accessible by the system.

In some embodiments, the system can be implemented by an application running on one or more server machines in an IT environment (e.g., IT environment 200, IT environment 300, etc.). The system is configured to manage the objects (including physical and non-physical objects) in the IT environment, and to provide a view of the objects in the IT environment that is much more accurate and more comprehensive than can be accomplished using traditional configuration management systems.

In the system disclosed herein, IT objects are considered very generically. Unlike conventional IT management systems, the term "IT object" encompasses more than simply devices in an IT environment. In embodiments disclosed herein, an IT object can be any type of object that has some significance to an IT environment in some way. For example, there can be three categories of objects in one embodiment of a system disclosed herein: objects that represent entities from the IT environment (e.g., computers, networks, incidents, changes, etc.); objects that represent "relationships" between other objects; and internal/support objects that are used to maintain the state of the system, handle the execution of the system behind the scenes, etc.

As to the first category of objects—objects that represent entities from the IT environment—they do not need to be physical objects. They could also be virtual objects. For example, a computer is a physical item—it can be touched, occupies space, and has a location. On the other hand, a "permission" is not physical at all, but is still an important entity in an IT environment which needs management. Interestingly, today many IT entities that have been thought of as "physical" entities now can be entirely virtual, too. For example, computers can be physical objects or virtual entities. These objects are all referred to herein as "IT objects". Within this category of objects, there exist object types which represent specific entities, for example there is a "computer" object type, a "network device" object type, and many other types which represent very specific IT entities. Each of these object types defines and thus is associated with a set of attributes that correspond to the type of entity. There can be other object types that are intended to represent objects that have a very generic set of attributes. Example attributes are provided below.

In this way, any object in an IT environment can be modeled as an IT object and related to other IT objects. For example, the contents of a yellow post-it note stuck to the side of a computer can be captured in an IT object (e.g., as a knowledge object) and then related to the IT object corresponding to the computer via a "documents" relationship. From this point forward, that key piece of knowledge is represented in the system. In this manner, many things which would not typically be considered IT objects can be brought into the system and managed appropriately via specific relationships. This allows the users to capture information which typically considered "tribal knowledge". Another aspect of the object/relationship management and the associated graph traversal logic is that it is very each to see information from both sides of a relationship. For example, when looking at IT object computer X, one might see that it is "governed by" IT object policy Y. While this alone is interesting, the system allows the user to navigate to IT object policy Y, so that the system will show all things governed by policy Y (where policy Y is now the center of the focus). One of these things will be the IT object, computer X. This is an extremely powerful feature.

The second category of objects is relationship objects (i.e., a relationship itself is an object). The objects that represent relationships allow any type of relationship to be defined. This provides a much richer meaning of how objects are related, in addition to the fact that they are related. Specifically, instances of relationships can be defined to relate two specific objects together. For example, the IT object "houfw01" (representing a firewall) could be related to the IT object "housw03" (representing a switch) via a "connected to" relationship. This would mean that houfw01 is connected to housw03. The relationship objects have attributes which specify the two IT objects that are related, the type of the relationship (how they are related), the importance of the relationship, descriptions and a variety of other attributes which are used to render the relationship (line style, color etc.). Relationships can be social IT objects in the system which means relationships can have their own corresponding activity streams. So, when a change is made to a relationship (e.g., from "connected to" to "depends on"), the change can be reflected in that relationship's activity stream as well.

The third category of objects is supporting objects. The objects that are used behind the scenes are all internal objects. They are used by the system to maintain the state of the system, handle the execution of the system behind the scenes, and perform similar functions. These objects are not directly exposed to the end user. As noted above, these objects are referred to as internal/supporting objects.

Referring again to the first category of objects, IT objects, there can be various types. In some embodiments, IT objects can include the following types: physical objects; virtual objects; locations; people; process objects; knowledge objects; and policy objects. Physical objects are tangible objects such as computers, network devices and printers. Virtual objects are any objects that are not tangible, but still need to be managed in some manner. Examples include virtual machines, groupings and permissions. Location objects can be physical or virtual, and typically contain other objects. Examples include sites, rooms, floors, cubicles, buildings, racks and datacenters. People objects include such things as users, contacts, vendors, manufacturers and groups of users/contacts. Process objects include anything that contains information about processes relating to objects, or which capture the state of something specific to an object. For instance, an incident object could capture the fact that the response time of object X is slow. Examples of process objects include incidents, problems, changes, solutions, workarounds, and tickets. Knowledge objects are objects that capture information about other objects in the system. For instance, a knowledge object could capture the "startup procedures" for a specific database object, or could contain a policy that governs a specific business application. A specific grouping of objects is another type of knowledge object. Policy objects describe policies that govern other objects so that they can, for example, comply with business policies, service level agreements, security postures, etc. There are numerous ways to describe an IT environment. What is actually modeled in a system will depend on the goals of the organization owning and operating the system. As such, the objects needed to model different environments can be wide and varied. Embodiments disclosed herein provide an end user with an ability to extend the objects, particularly the first category of objects described above, in a system and to extend the attributes on any object in the system.

Figure 6:
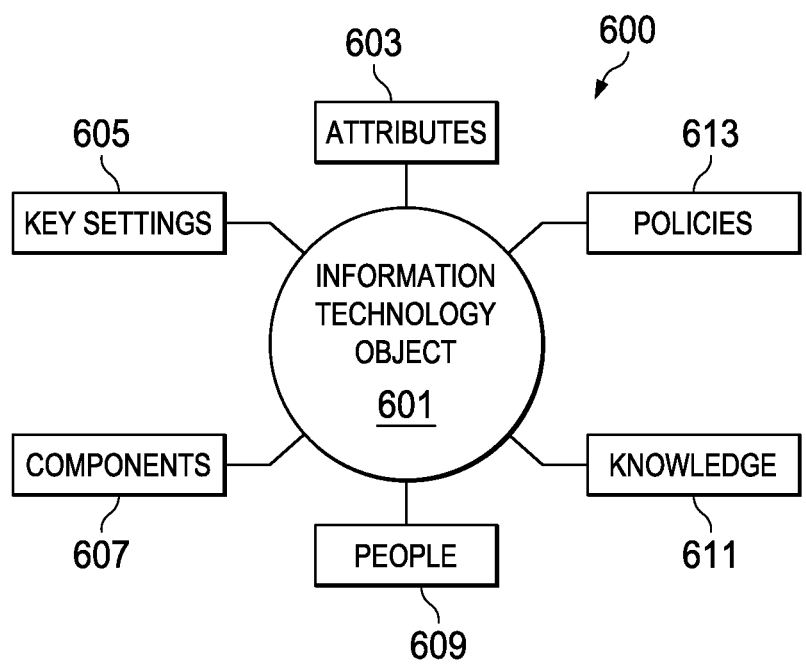
FIG. 6 depicts a diagram illustrating an example object model for IT objects in an IT environment.

As an example, FIG. 6 shows one embodiment of object model 600 for IT objects in an IT environment (e.g., IT environment 200, IT environment 300, etc.). Each IT object 601 has a set of attributes 603 which describe specific parts of the object. Example parts of the object include name, type, description, location, visibility, criticality, etc. In some embodiments, a relational database may be configured to store all IT objects in an IT environment in a persistent manner. Each object type is represented by a table in the database and each object attribute has a corresponding column in the table. Each object instance is represented by a row in the table. Each row has a unique identification (ID) which is the primary key and uniquely identifies each object instance. An example table is illustrated in FIG. 7.

Figure 7:
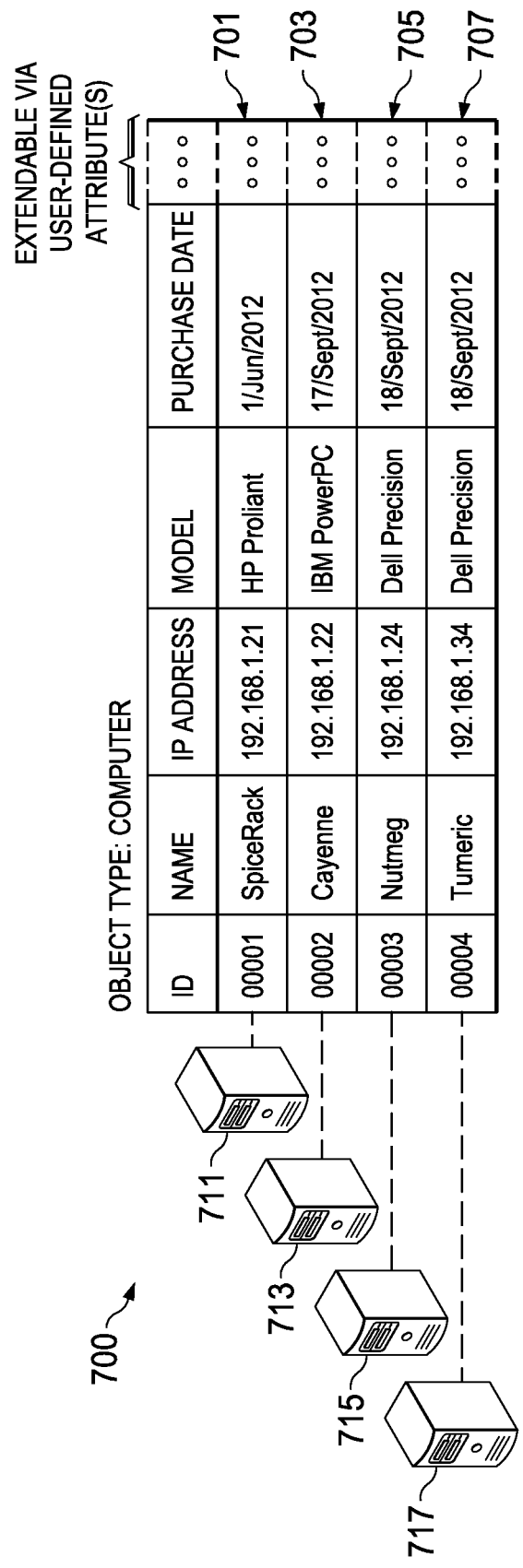
FIG. 7 depicts an example data structure for storing attributes of an object type.

In FIG. 7, table 700 is configured for a computer object type. Attributes are listed in columns of table 700, including "Name," "IP Address," "Model," "Purchase Date," and numerous other attributes (not shown). In some embodiments, table 700 can allow user-defined attributes be added, for instance, by extending column(s) of table 700. Each row in the object table representing an instance of the computer object type having the set of attributes. In this example, table 700 shows four object instances, identified by their respective unique ID, with IT object 701 representing computer 711, IT object 703 representing computer 713, IT object 705 representing computer 715, and IT object 707 representing computer 717.

Some IT objects are linked to other IT objects. For example, ComputerX "is connected to" Computer Y and ComputerX's "model is" ModelA. In such examples, the ID of the one type of object is an attribute of another. The primary key of one object in another table is called a foreign key. For example, in a relationship object type table, the "Left" and "Right" attributes are foreign keys referring to other objects. In the computer object type table shown in FIG. 7, the "Model" attribute is a foreign key referring to a row in a model object type table (not shown).

In this disclosure, attributes of an object form its "profile". Every object can have some common persona attributes, like "Name", "Description", "Deployment Status", etc. However, specific attributes are determined based on the type of the object. For example, a network object and an incident object may have different sets of attributes. Some attributes may be predefined as defaults and some may be user-defined custom attributes. In some cases, when specific key attributes (explained below) are set, the time is recorded, along with the attribute values.

Returning to FIG. 6, IT object 601 may be associated with components 607 such as application tiers, core services, processes and the like in an IT environment. As a specific example, for an IT object representing a computer, a random access memory may be a component of the computer. People 609 such as experts, administrators, service owners, and so on may be those who are directly involved with IT object 601. In this context, people 609 does not include "followers"—those who follow IT object 601 but are not directly involved in IT object 601 itself. For example, an administrator assigned to an IT object representing an email server may be one of its people (represented as a people object). A user following the email server may be notified when the status of the mail server has changed, but the user is not listed as one of its people.

IT objects 601 may also be associated with knowledge 611 and policies 613. Examples of knowledge 611 that may be associated with IT objects 601 may include documents, discussions, frequently asked questions (FAQs), fragile settings, management applications, etc. For example, a user manual for a computer may be a knowledge object relating to the computer object. Further, an IT object may relate to multiple knowledge bases such as an internal wiki page, an external reference site, a vendor's knowledge base, etc. Examples of policies 613 that may be associated with IT objects 601 may include regulatory policies, best practice policies, roles and responsibilities in the IT environment, etc. Key settings 605 may be stored in files, registries, and database tables. A key setting may reflect knowledge that is not coded. For example, a user may enter a key setting for a computer object, stating that the operating system running on the computer should not be automatically updated because a software application running on the computer only works with the particular version of the operating system. Key settings can be placed on knowledge objects and policy objects and pushed to everything linked to such objects.

As discussed above, each IT object has an associated activity stream which captures communications, notifications and other pieces of knowledge related to the object. Because the activity stream allows users of the system to collaborate with each other in regard to the IT object, the activity stream may also be referred to as a collaboration stream. This and other features of IT objects are described below. In embodiments disclosed herein, IT objects can include some or all of the features described below.

Each IT object has a "Name" and an "Owner". The owner can be an individual person or a group of people in an environment implementing a system disclosed herein.

Each IT object has a "profile" or "persona" and a set of "metrics" which indicate the completeness of the profile. The profile can be thought of as all the attributes specific to a particular IT object. In this disclosure, attributes could be more than just name-value pairs. For example, attributes can include relationships to other objects, whether the object is used or referenced, etc.

Each IT object has an "activity stream" which is an area where topics, comments, and the like can be posted. In some embodiments, the content of the activity stream would be in the context of some aspect of the particular IT object. When an IT object is created (as an object instance of an object type), a corresponding software object is instantiated as an activity stream for the IT object from a predefined class having a set of attributes. The set of attributes for the activity stream may include an activity stream name and a foreign key of the object instance which owns the activity stream. This internal/supporting object is not a social object (i.e., there is not an activity stream for an activity stream). It can be a database object with state attributes mostly internal to the system. Since there is a one-to-one relationship between a social object and an activity stream, the same is true for an IT object and its activity stream. As discussed above, an activity stream manager may be configured to manage these activity streams.

Each IT object has a "status". In some embodiments, this can be a message indicating something special about the IT object. For example, "Going offline for regular maintenance soon" could be a status message.

In some embodiments, topics and comments on an activity stream can be "rated". The rating allows users to provide feedback on high quality topics/comments and also allows users to find high quality topics/comments. The "rating" or the like feature can also provide immediate feedback as to how many people actually view the topic/comment in some capacity and got something out of it.

In some embodiments, users and groups in the system can collect "badges" by interacting with the IT objects. Badges can be acquired by meeting specific pre-defined goals (e.g., a "first comment" badge could be awarded the first time a user comments on something. A "50+ comment" badge could be awarded when a user comments on something 50 times). Badges could also be awarded on a group basis also to encourage competition between groups. All areas of object management could be eligible for the awarding of badges (e.g., setting 50+ attributes, updating more than 100 objects, etc.). Some badges could be awarded on a discretionary basis (e.g., one use could award another user a "You made my day" badge for providing some timely help, or a manager could award a "team player" or "super star" badge to recognize good work).

In some embodiments, a "Promote to Knowledge" function (e.g., via a popup window or an embedded section entitled "Involve other processes" which may also include an "Attach Involved Link" function) is provided to enable specific topics and comments from activity streams to be converted into formal knowledge objects within the system. Such knowledge objects are handled in the same manner as other IT objects.

In some embodiments, the system may have the ability to make "automatic comments" and/or "posts" on IT objects. This may occur when related IT objects are updated in ways that affect other IT objects. The automatic comment would be posted to the activity streams of other related IT objects automatically. For example, if object X is related to object Y, then object X's activity stream would receive a new topic indicating that object Y is related and vice versa. As another example, if a "change" is planned to object Z, then object Z's activity stream would receive notifications. In some embodiments, activity stream posts are represented by a "Post" object type and have attributes including a foreign key of the activity stream to which the post belongs, content of the post, attachments to the post (foreign key), date of the post, and various other attributes about the post for maintaining the internal state. In some embodiments, activity stream comments on a post are represented by a "Comment" object type and have attributes including a foreign key of the activity stream to which the comment belongs, content of the comment, attachments to the comment, date of the comment, author of the comment (foreign key), and various other attributes about the comment for maintaining the internal state.

Each IT object has "followers", or interested users. An IT object owner is one follower, but any other user in the system can follow the IT object. When an IT object is followed, each follower receives updates about new topics/comments that occur with respect to the IT object that they follow.

Each IT object can be related to other IT objects. For example, object X might be "connected to" object Y, in which case object X and Y are considered "friends" of each other. There can be different types of relationships between two IT objects. For example, one IT object may be managed by another IT object. As another example, a computer object may depend on an application object.

In some embodiments, IT objects and activity stream topics/comments can be "tagged". Tagging is a community driven mechanism for categorizing knowledge in some manner.

In some embodiments, each user can create a "favorites" list that allows them to accumulate the IT objects that are important to them. This concept is generalized to allow each user to create a variety of lists. For example, an "important" list might hold the IT objects that are critical to the environment from a user's point of view, or a list called "Fred's objects" might represent the IT objects a user oversees from another user named "Fred", etc.

"Personalization" features allow the system to alert specific users about various things based on the behavior of other users. For example, a user who is a member of the "help desk" group may be alerted to the presence of other object based on what other members of the "help desk" group viewed or manipulated.

"Location awareness" features take advantage of the capability of knowing where IT objects are by making correlations concerning this information. For example, if a change request exists for object X and object Y, and these objects are known to exist in data center Z, the system can identify administrator(s) at data center Z to perform the change.

In some embodiments, "temporal" information is also maintained for each IT object. For example, "creation time", "last update" time, times when comments are made, etc. can be automatically tracked and stored.

In some embodiments, "news items" containing important announcements that could affect all users of the system can be posted. Some new topics can be automatically created by the system. News items can be related to specific IT objects as well.

These unique features of IT objects provide a working foundation for many unique features of the system:

In-Context Collaboration and Rating.

The activity stream associated with each IT object is one of the many unique features of the system. The activity stream can be a set of supporting objects which maintain the state of the conversation. This allows topics to be created and comments on topics to be entered in relation to each IT object. The fact that every IT object has an activity stream allows very focused, in-context collaboration to occur. Each topic or comment can be rated. In one embodiment, two types of rating are possible. The first is a like/dislike mechanism. Each comment or topic can be liked by a user or disliked by a user. A running count of the number of likes and dislike votes is maintained. Each user can only like/dislike something once. A second option is a star rating mechanism. In this case, each topic or comment can be rated by the user via a simple star system. One star would indicate it is a poor quality topic/comment, while 5 stars would indicate a high quality topic/comment. No stars would indicate that the topic/comment is not rated. The actual star rating is shown next to the comment. Each user can only contribute one vote to a star rating, but it is possible to change the vote. The overall rating of the topic/comment is determined by averaging the number of stars given by all the voting users. Ratings can be used to search for popular or high quality comments within an activity stream. Other types of rating mechanisms may also be possible.

User Activity Reward.

The activities of each user can be tracked when they are manipulating IT objects. The information collected via tracking can be used to implement a reward-based badging system. Some examples of what may be tracked include: comments added to an object's activity stream; topics created on an activity stream; the number of IT objects created by type; and the number of IT objects edited by type. This information can be used to award "badges" to users once thresholds are met. For example, if a user creates 25 computer objects, he or she may earn the "Silver Computer Creator" badge. If the user creates 100 computer objects, he or she may earn the "Gold Computer Creator" badge. The actual badges which can be awarded and the criteria that the badges are awarded for is defined by users of the system who have the power to create badges (e.g., admins and managers).

Direct Knowledge Promotion.

Another feature of the activity streams associated with IT objects is that topics and comments can be "promoted to knowledge". There are times when the information provided in the collaboration which occurs in the activity stream will be deemed so useful that it will be promoted to knowledge. When this occurs, an IT object of type "knowledge" is instantiated and the content of the topic from the activity stream is stored in the knowledge object instance. The user who promoted the knowledge is given the opportunity to provide more information, give the knowledge a name, etc. Once the promotion is complete, the knowledge object is automatically related to the IT object which owns the activity stream. At that point, the new knowledge IT object is part of the universe of all objects and can be related to other objects in the same manner as any other IT object.

System Generated Topics/Posts/Comments.

The activity stream contains not only user comments, but also automatic topics/posts/comments. When certain events occur in the system, the system will automatically generate and add topics/posts/comments to the activity streams of those IT objects involved with the event. Some examples of events which trigger automatic topics/comments include the following.

Relationship creation: recall that when two IT objects A and B are related, a relationship object is created. When this relationship object is created, the system posts a comments to A's activity stream indicating B is related and, conversely, a comment will be posted on B's activity stream indicating that A is related. The information about the type of relationship created is also included.

Follow/Unfollow operations: whenever someone follows/unfollows an IT object, an automatic comment is sent to the object's activity stream to notify the followers of the operation.

Setting attribute values of an IT object: specific attributes in an IT object can be tracked. When a tracked attribute is modified, an automatic topic/comment is posted to the object's activity stream.

Domain Specific Operations: there are a number of IT objects in the system which provide for higher level features beyond the base level management, manipulation and visualization of the objects in an IT environment. These objects are also IT objects, but tend to exist based on the fact that other IT objects exist. Some examples of these IT objects include: meaningful collections of IT objects; changes/change items which are IT objects that manage changes to other IT objects; problems/incidents, which are IT objects for managing issues which affect other IT objects; and channels, which are IT objects for managing the change control process of other IT objects. Aspects and examples of channels are described in the above-referenced U.S. patent application Ser. No. 13/753,799, filed Jan. 30, 2013, entitled "SYSTEMS AND METHODS FOR IT SERVICES AND SOCIAL KNOWLEDGE MANAGEMENT USING CHANNELS," which is incorporated herein by reference.

When higher-level objects are created and then bound or related to other IT objects, the activity stream of both objects are updated to indicate the higher level operation. For example, when a "change item" A focusing on IT object X is created on change M, then the activity stream of M is updated via an automatic topic/comment to indicate a change item was added to the change. Further, the activity stream of object X is updated to indicate that is part of change M and change item A.

There is no limit to the types of automatic topic/posts/comments which can occur. Essentially, whenever the internal state of the data changes, an automatic topic/post/comment could be posted to an activity stream.

Humans as Social Objects.

One of the IT objects in the system is the "user". In an IT environment, users of the system are typically the IT staff, and the members of the IT staff are a very key part of any IT environment. For each user of the system, there is a corresponding IT object to represent the user. There may also be IT objects to represent groups of users. Given that the system is aware of these objects, not only can the reward/badge system track personal achievements, but group achievements as well.

Locations as Social Objects.

Another feature of the system is that locations are treated as IT objects. Just as other types of IT objects can be related to each other, IT objects can be related to locations. Further, since each user and each contact is also an IT object, location information can be maintained about the people in the IT environment. This location information can be exploited when manipulating various IT objects. For example, it makes little sense to assign a change which requires physical access to an IT object to someone who is not near the IT object. Location information can therefore be used to identify a user who is near the relevant location. The location information becomes even more useful when GPS data from mobile devices can also be used. Task scheduling can be optimized by exploiting the locations of IT staff when tasks are assigned.

Personalization.

Another social feature involves personalization. In this disclosure, personalization is the process of collecting information about users and combining that information with data collected from other users to be able to intelligently offer suggestions to the user based on the behavior of other similar users. Consider a simple scenario in which user X updates an attribute Y of object Z. Later, another user M updates an attribute of object P, which is similar to object Z or even related to object Z, either directly or transitively. The system might offer to set attribute Y on object P to the same value as object Z. The determination as to whether the suggestion is made would consider various factors, such as the similarity of the objects, the manner in which they are connected, and the IT objects to which they are connected. The similarity of the two users (whether they both work in the same group, for instance) may also be considered. The features of the attribute could also be considered. For example, it would not make sense to offer the suggestion for a name attribute, as those values are typically unique. It might be reasonable, however, to assume that two similar objects in the same room might share the same administrator, rack or key settings.

Follower Notification.

In this disclosure, any IT object can be "followed". When a user follows an object, he or she will receive notifications when any activity occurs in the IT object's activity stream. The notifications can be received in various ways, such as via email, via a desktop client which is capable of viewing all followed activity streams, via a web activity stream viewer, or via the user's home page when logging in to the system. An object that is followed can be "unfollowed" as well. When an IT object is unfollowed, notifications to the user resulting from changes to the activity stream will stop.

Tagging.

Tagging is another social feature which can be implemented in the system. A tag is a label that is associated with an IT object in the system. The tag can be created by a user as a way for the user to easily find the object again in the future. Tags can be any text string. A tag might be used to indicate an IT object is part of some application (e.g., an object could be tagged with "payroll system"), or that an IT object is having issues (e.g., could be tagged with "busted"), etc. Objects can be searched for and organized using tags. Over time, tags defined by users of the system can form a community-built ad-hoc index for IT objects in the system.

News.

The "news" feature is another social feature in the system. News items can be created and published. When news articles are published, they are categorized by topic using a predefined set of categories. News items are presented to the user if the category of the news item matches a predefined news filter of the user. Each news item can also be associated with an IT object, and that association can also be used as a filtering mechanism in each user's news filter. Some categories of new article are always made available to the user. For example, new items indicating information about the status of the system itself or any new item which has an "emergency" type of category may always be presented to the users. News items could contain information about events coming up in the IT environment, or details about a major change to a specific object. The news may be presented to the user in several places. For example, a news ticker may be used to slowly scroll the new topics matching a user's filter across each page of the user interface. There may also be a dedicated portion of the user interface that will display the list of news items and allow the user to read the news items in full.

Collateral Information.

In addition to having social features, the IT objects in this disclosure enable types of information that are not conventionally stored in a CMDB to be associated with the objects. These types of collateral information can include, for example, documentation about the object, documentation about how to manage the object, best practices, information about backup/recovery, disaster recovery, etc. Any documentation that is pertinent to the IT object can be related to the object. Another type of collateral information is policy Information which affects the object. Key settings that are important to the object or that are fragile may be associated with an object. These settings would typically be those settings that could affect the security or compliance posture for the object in question, or specific steps on how to perform an action based on specific relationships of the object, or specific configurations that are sensitive to performance or availability impacts. Automations that are used to manage an IT object may be associated with the object. These are things like backup scripts, monitoring applications/scripts etc. This includes information which is maintained by the owner of the object and which is often lost when the owner leaves his or her role due to attrition, transfer, promotion, etc.

Collateral information may also include ownership and management assignments relating to the object. This type of information may capture, for example, the person responsible for the object, the person who is assigned the object, the IT group who manage the object, or the department to which the object belongs. Another type of collateral information is notes that are specific to an actual instance of an IT object. Providing note-type information is akin to placing a yellow post-it note on the side of a machine with an important tidbit of information. Management Apps related to an object are another type of collateral information. Management Apps information for an object could indicate, for instance, the particular performance management tool that is used to monitor the performance of the object. By capturing this type of information, IT users can quickly understand how management products are related to objects in the IT environment.

As mentioned above, the IT objects in this disclosure are social objects which have features that enable the use of social methodologies. Specifically, each IT object has an associated activity stream which captures communications, notifications and other pieces of knowledge related to the object. The activity stream allows users of the system to collaborate with each other in context relative to the object which, in one embodiment, includes all of the features described above.

The system allows users to create IT objects and Relationships. When a number of IT objects and Relationships have been created, a graph can be formed. The Objects are nodes in the graph and the relationships are links in the graph. The graph typically becomes a single connected graph over time, but this is not required. Initially, the graph would likely contain a number of disconnected islands and, as more objects and relationships are defined, the islands would merge into larger components. The graph which is formed may be referred to as a "Small World" graph. In this type of graph, object X will have some number of related objects. Each of these objects may have some number of related objects. Each object may therefore be directly related to one set of objects, related via a single degree of separation to another set, and so on. For example, if computer X is connected to router Y, and router Y is connected to network Z, computer X is connected to network Z via a single degree of separation through router Y.

In embodiments disclosed herein, users of the system may interact with and/or have access to these and other features via a user interface. For example, referring to FIG. 3, user 305 of system 330 may interact with and/or have access to at least some of the features described above using a browser running an instance of user interface 399 on client device 315. The system may allow a user to start with any object and see all the objects that are related to that object. The user can then drill down on any related object, and the objects related to that can be seen. This provides a mechanism for the user to traverse the graph that represents the IT environment, providing the user with a view of the objects in the IT environment that is much more accurate and more comprehensive than can be accomplished using traditional configuration management systems. Again, this is accomplished through the use of social methodologies with respect to the IT objects.

In particular, the IT objects can be grouped into perspectives. These perspectives allow users to focus on the IT objects in which they have an interest, without being obscured by IT objects in which they have little or no interest. Perspectives themselves are also IT objects within the system. Thus, perspectives also have features, including associated activity streams that capture communications, notifications, events, and the like which relate to the objects and that enable collaboration between users and facilitate entry and maintenance of information associated with the IT objects. It should be noted that perspectives may include non-social objects in addition to social objects. Perspectives may be effectively overlaid on objects that are conventional in design and/or do not have features that enable the social methodologies described herein to be implemented at the IT object level. In this manner, even conventional objects may be managed using the social features of the perspectives with which they are associated.

Perspectives are a very personal construct. Any user on the system can create a perspective using the relationships and objects in the data store. The perspective each user builds will be something unique and useful to that individual, or the individual's team. Some perspectives will become more widely useful and can be published more widely using a group-based sharing mechanism(s).

At a high level, perspectives represent a subset of relationships present in the object store. A relationship is a social IT Object that has a "left" object, a "right" object and a "type" object. The left object and right object are references to any two Social IT Objects. The "type" indicates how the left object and the right object are related. In general, the left object is "related to" the right object by the type object. For instance, for a particular computer in a particular room, the left object is computer X, the right object is room Y, and the type is "located in". Each relationship may contain additional information about the relationship. For example, this information may include default rendering information, impact direction and impact weighting. "Impact" refers to an affect that one object might have on another. If, for instance, object A depends on object B, then the impact direction is from B to A. The impact direction can be left to right, right to left, bidirectional or empty. The impact weighting, indicates how severe the impact is.

Figure 8A:
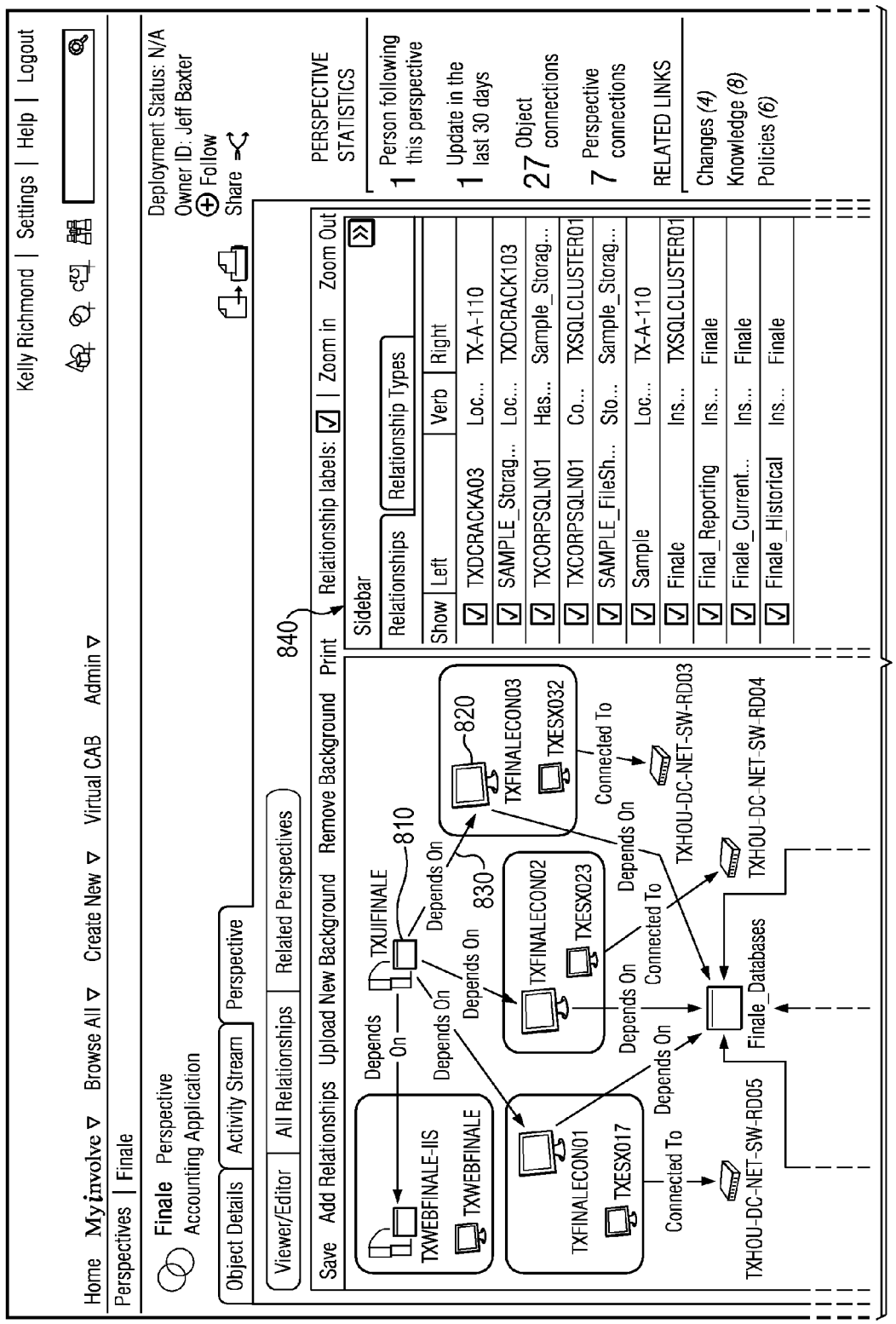
FIGS. 8A-8B depict diagrammatic representations of an example user interface showing a view of a perspective and the objects and relationships included in the perspective.
Figure 8B:
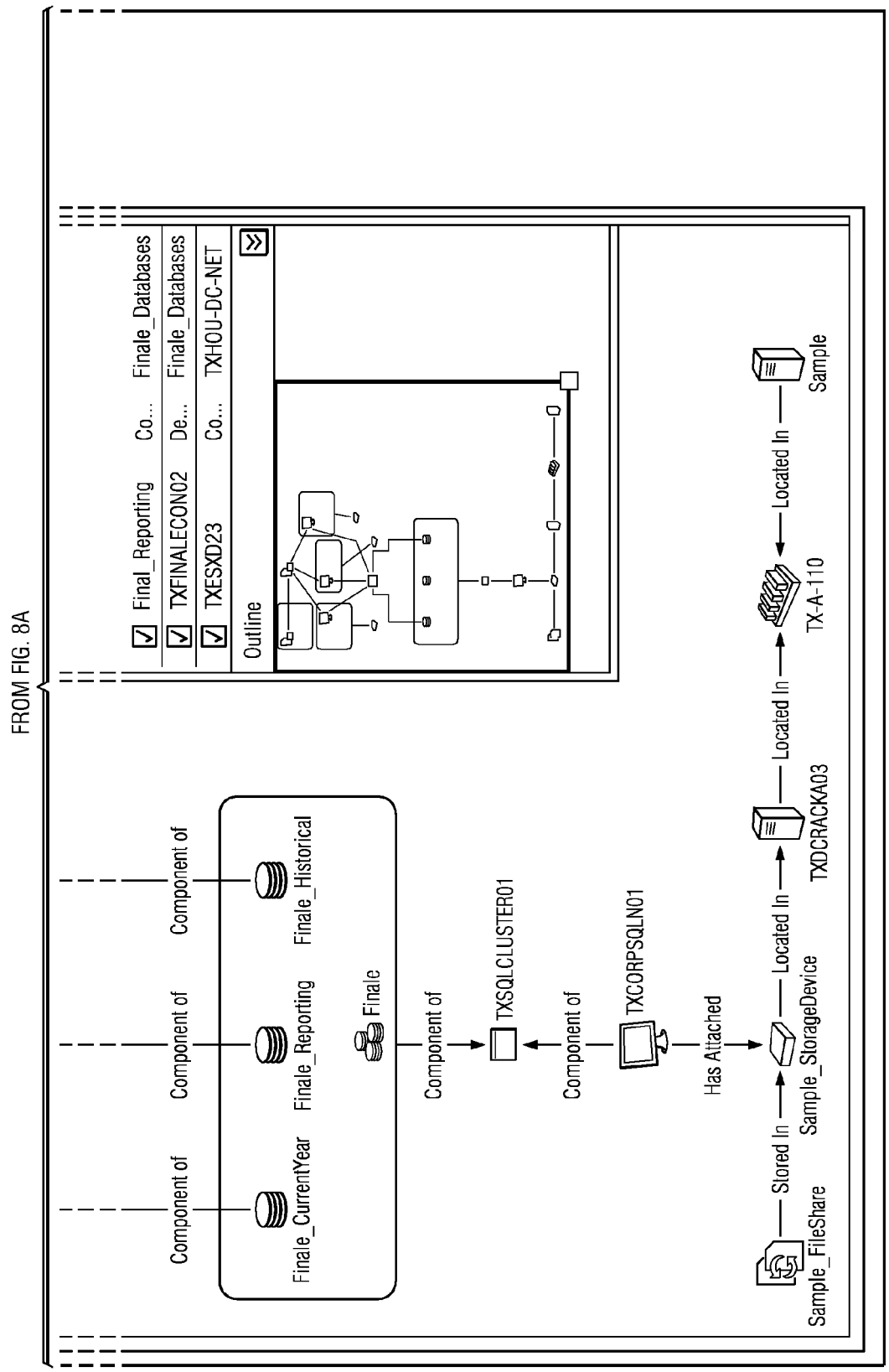

Because the system tracks the relationships between the objects and relationships within a perspective, the perspective can be displayed in a graphical form. Referring to FIGS. 8A-8B, an exemplary graphical user interface (GUI) showing a perspective viewer/editor is depicted. The perspective viewer/editor retrieves information from the data store about relationships between the physical and virtual devices, business services, policies, people, etc. that are in the perspective and displays the objects and their relationships to each other. This gives users a holistic tool to profile this subset of the IT environment. The map of the objects in the perspective provides knowledge associated with all of these objects available in one place, without the noise of other objects obscuring the view. As depicted in FIGS. 8A-8B, the perspective viewer/editor displays both the objects (e.g., 810, 820) and the relationships (e.g., 830) between the objects. A sidebar 840 displays some basic information associated with the objects, including their relationships and the relationship types.

The perspective viewer/editor can display the attributes of the perspective or knowledge associated with the perspective (e.g., in a sidebar), and/or information on the objects within the perspective. The perspective viewer/editor also allows users to drill down by selecting one of the objects in the perspective. The perspective viewer/editor can display attributes of the selected object, or can display all of the relationships of the selected object with other objects in the IT environment. Filterable lists of the objects in the perspective which can also be exported and printed. The map of the perspective allows its owner to see exactly where their objects of interest fit into the entire IT environment, and allows object owners to see what their objects depend on and which objects depend on their own.

As social objects, perspectives may include a number of features that enable or facilitate assessment, collaboration, decisions, reporting and the like based on shared understanding of those users that utilize the perspective. This provides IT staff more value than conventional configuration management systems without adding to their administrative burdens. The social features of perspectives may include, for example, the ability to "follow" the perspectives so that when changes occur or notifications are posted followers are automatically notified, the use of an activity stream that automatically logs relationship updates as well as all conversations from followers, and the ability to "share" perspectives with administrators, external vendors or other users, eliminating the need for time-consuming descriptions, or ad-hoc diagrams at inconvenient times.

Perspectives can be built in various ways. For example, in one embodiment, a perspective can be built using a perspective editor, an object browser, or a relationship based search.

The perspective editor allows the user to start with an empty perspective and then search for objects and relationships that can be pulled into the perspective. Once the objects are in the perspective, they can be arranged graphically. It is also possible to clone an existing perspective into a new one and then add objects and relationships to it, or remove them from it. The object browser is a graphical way of exploring all objects and relationships in the system. The browser allows the user to start from a specific object and then start exploring from that object via the relationships that object has with other objects. From each object in the browser, specific relationships can be traversed and the objects at the other end of the relationship are added to the browser view. Once the user is happy with the objects in the view, a function can be invoked to add all the explored objects in the current browser view to a new perspective. To form a perspective based on a relationship based search, the search is performed and a function is invoked to create a perspective using the resulting set of objects.

Individuals and teams build perspectives to represent the part of the IT environment that they care about. In some embodiments, perspectives can be static. In some embodiments, some features may be provided to allow them to better represent objects and relationships in a dynamic IT environment. For instance, in one embodiment, relationships may be added to a perspective using rules. For example, the perspective may include all "connected to" relationship where one end of the relationship is "switch XYZ". In this case, the perspective changes when changes to this group of objects occur. The rule can be granularly applied to a specific part of the perspective. The perspective owner may alternatively be notified of potential changes to the perspective, instead of having the perspective automatically modified.

In one embodiment, all perspectives reference objects/relationships from the underlying object store. Thus, it can be important to know which of those objects have been included in a perspective as it indicates that they are more important than other objects in the object store.

In one embodiment, objects and relationships are reference counted. Each time a relationship is included in a perspective, that relationship's reference count is incremented. Similarly, the reference counts of both objects that are linked by the relationship are incremented.

Perspectives represent someone's view of the world. When that world changes, it is important to notify interested parties. There are two ways perspectives can change.
1) Someone adds/removes objects/relationships in the perspective (i.e. the objects/relationships still exist outside the perspective, only the perspectives inclusion of those objects/relationships changed.
2) Someone removes objects/relationships that exist in the underlying object store, thus potentially destroying every perspective which references those objects/relationships. Objects and relationships are reference counted so that when objects/relationships are deleted from the object store they are really just "marked for death". At such a time, perspective owners would receive notification via the activity stream and would be given the opportunity to update their perspective. When the update occurs, the objects/relationships would be removed from the perspective, thus reducing reference counts. Or the deletion could be deemed to be a mistake and it could be "undeleted". If the reference count gets to zero, then nothing is using the object/perspective anymore and it would be safe to remove from the object store. In one embodiment, this would happen automatically.

Thus, objects/relationships that are deleted are marked for deletion, and each deleted object or relationship is shown shaded in perspective. These features allow the perspective owner a chance to recover from the change to the underlying object store. Another feature is the ability to "freeze" a perspective. There are times when the user wants to take a "snapshot" of a perspective and use it for comparisons with a corresponding live version of the perspective that is subsequently updated. Tools can also be provided to allow the differences between frozen and live perspectives to be highlighted.

From the foregoing, it can be seen that perspectives provide a mechanism for users such as IT administrators to group a subset of objects in an IT environment to be stored together as a named entity. This entity includes objects and relationships between the objects that are already in the object store. Perspectives can represent Business Services in an enterprise, network topologies of a virtual environment, a map of infrastructure governed by some Policy, and other meaningful groupings. Perspectives may provide various features, such as the following:

graphical views of the objects in the perspective, enabling visualization of specific part of an IT environment which would otherwise not be available;

filterable lists of the objects in the perspective which can be exported and printed;

handling of perspective objects in the same manner as other objects, so that they have social features;

association of knowledge with the perspective;

perspectives can be "followed" so that when changes occur or notifications are posted followers are automatically notified (a perspective can optionally follow objects in the perspective as well);

perspectives are typically small subsets of the entire IT environment that apply to the day-to-day job functions of particular administrators, so they have incentive to keep the perspective and the objects up to date, and can be rewarded for doing so;

overlap of perspectives can be tracked and mapped, facilitating the delivery of higher-level functionality that can be directly targeted to the appropriate user base;

mapping of perspectives allows perspective owners to see exactly where their objects fit into the entire environment, and allows owners to see what their objects depend on and what objects depend on their objects, based on their roles and needs;

the focus on objects and relationships in the perspectives tends eliminate the noise and dead objects in the object store so that they do not obscure meaningful information;

the perspectives can be filtered to specific object/relationship types;

heat-map enhancements can highlight specific properties about objects in the perspective; and perspectives can be shared with other users to facilitate efficient resolution of problems.

Figure 9A:

In the present system, every perspective has an associated activity stream. An exemplary interface is depicted in FIGS. 9A-9B. The activity stream includes messages, notifications of events, or other relevant information that is communicated between users or generated by the system in relation to the perspective. The activity stream enables communication to and among stakeholders as to the perspective itself or objects and relationships within the perspective (e.g., in the context of a specific problem to be solved). The activity stream enables the sharing of relevant information with interested stakeholders while at the same time eliminating extraneous "noise" or unrelated discussions. Although the perspective may be owned and designed by a particular user, other stakeholders can contribute information to the perspective and its objects, thereby increasing the amount of available information.

Since different administrators own different perspectives (typically ones which help them perform their jobs), it is in each administrator's interest to keep the information in his perspective and each underlying object/relationship in the object store up-to-date. This is a "divide and conquer" solution to many of the issues cited above. Since perspectives can be small subsets of the entire IT environment that apply to the day-to-day job functions of particular administrators, there is a powerful incentive for these administrators to keep their perspectives and the associated objects up to date. Further, some of the social features allow IT management to see perspectives' update activities and to reward administrators who actually keep their perspectives up-to-date.

Perspectives are instantiated from a class of social IT object in the system. Each perspective object has a typical set attributes which represent the perspective. The social features of perspectives are also inherited from the core social IT object. The specific components of the perspective object may include base attributes, such as name, description and ownership, as well as social attributes. There can be a variety of attributes, including, but are not limited to, View Counts, Ratings, Last modification date, creation date, numbers and types of objects, overlapping perspective info, etc. These are all attributes which indicate how others are affected by this perspective and as such are all considered very social. Further, other attributes can be monitored and injected into the social activity stream, e.g., if the name changes, or an object is added/removed, a new relationship is added etc. When anything interesting happens to the perspective a message is added to the activity stream for the perspective. This makes almost anything about the perspective "social".

The perspective object may also include a list of object relationship references. The object relationship references refer to relationships between IT objects in the underlying object store. Each relationship reference includes the references to objects on either side of the relationship, and may have information about how to render that relationship. In one embodiment, rendering information included in the perspective overrides a global set of rendering rules.

Many perspectives will "overlap" each other. The system tracks the overlaps and is aware of the map of all perspectives. This facilitates the delivery of higher-level functionality that can be directly targeted to the right user base. In one embodiment, a direct intersection list (or overlap list) is maintained for each perspective. This is the list of objects in the perspective that are also in other perspectives. An indirect intersection list is also maintained for each perspective. An indirect intersection occurs when an object A in perspective P is tightly coupled with object B in perspective Q. Such a tight coupling is indicated via an environmental or componentry relationship. For example, a virtual machine A in perspective P is tightly coupled to an ESX server B in perspective Q if the virtual machine exists on the server. The idea is that, if anything happens to object B, it also happens to object A, so it indirectly ties the two perspectives together.

Figure 10A:
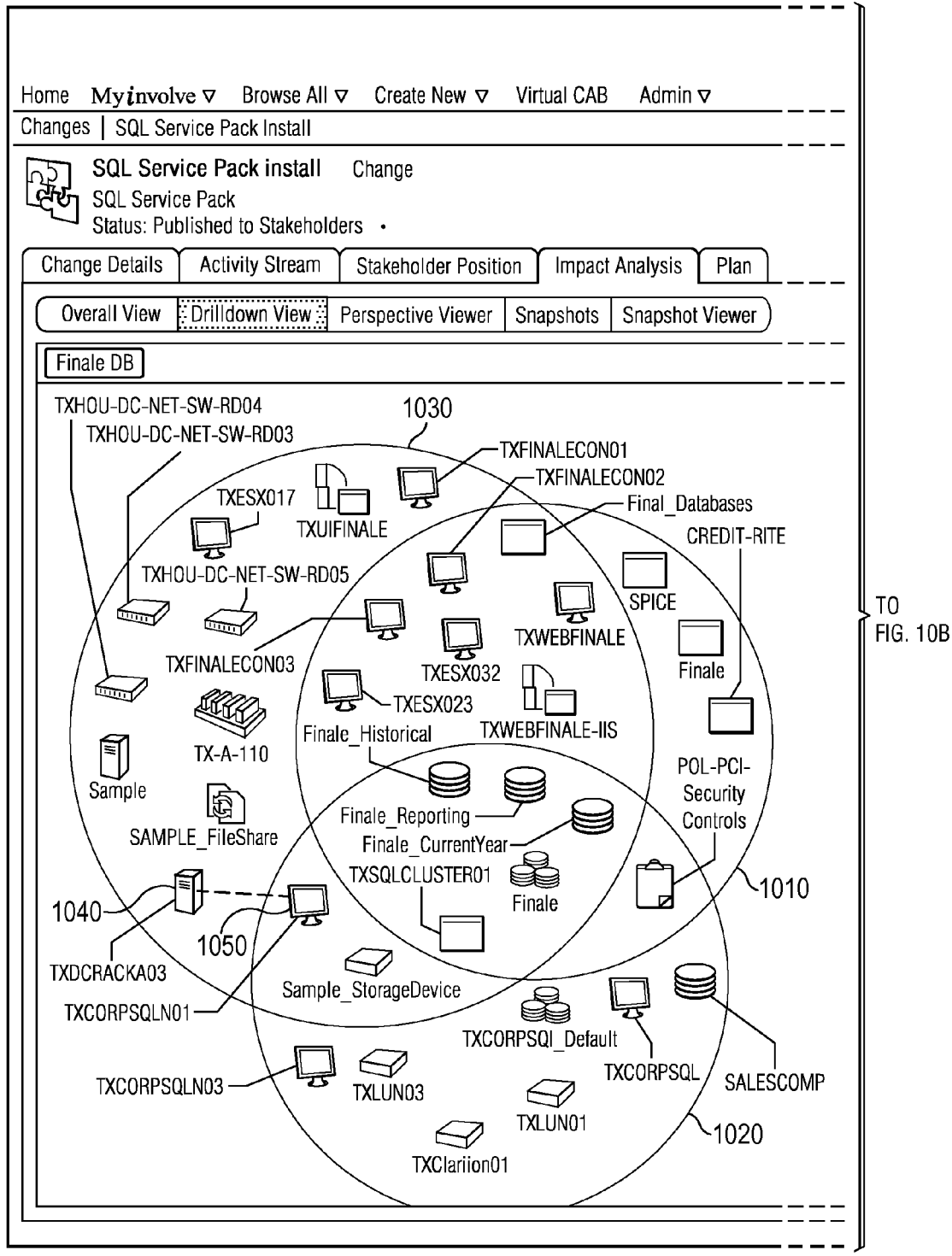
Figure 10B:
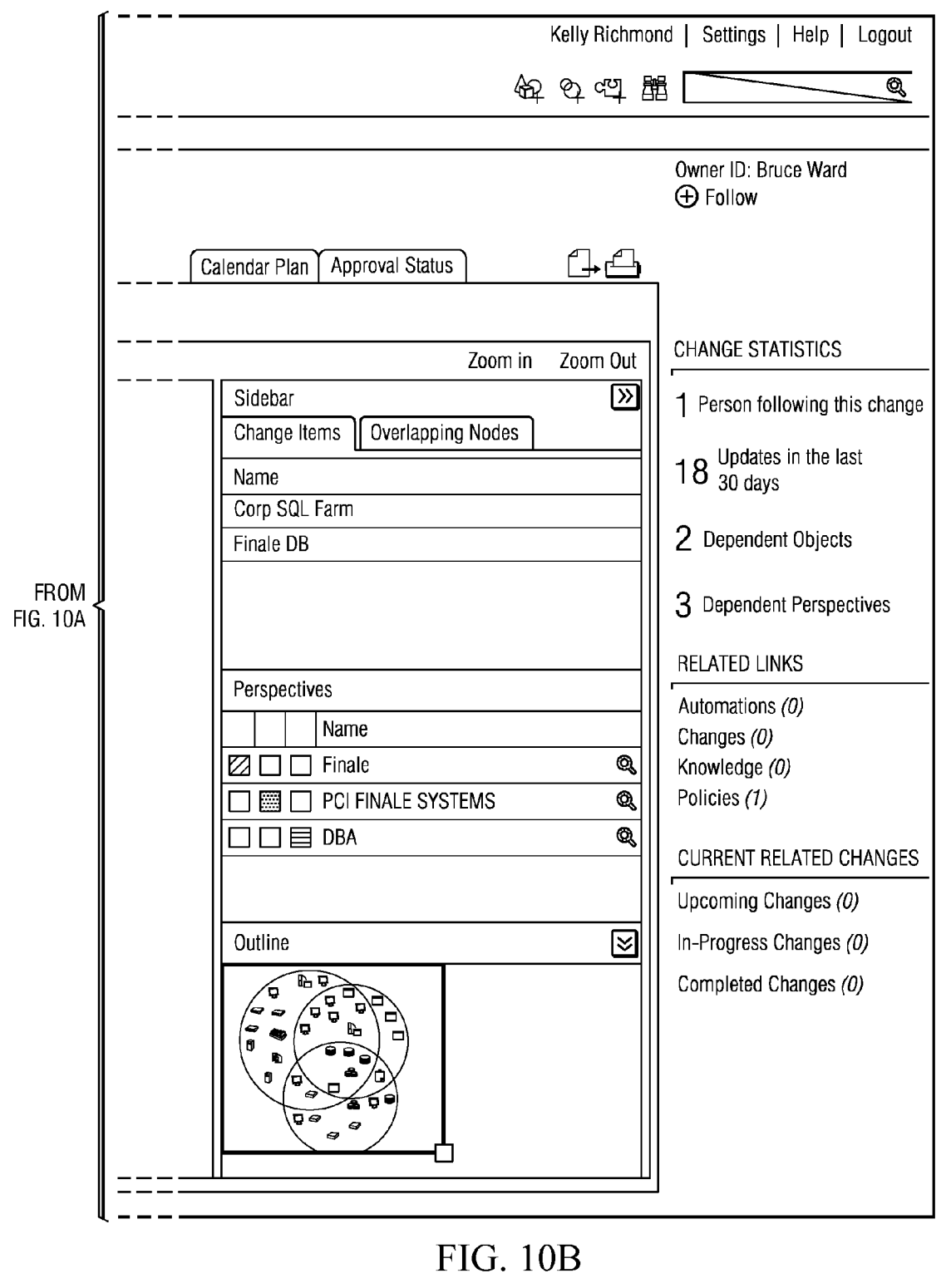

Referring to FIGS. 10A-10B, an exemplary view of a GUI showing the intersection of several perspectives is shown. In this embodiment, the overlap between up to three different perspectives (1010, 1020, and 1030) can be viewed. In one embodiment, it may be possible to view additional perspectives. It can be seen in FIG. 10A that there are objects which are common to each pair of perspectives, and several objects are common to all three perspectives. When one of the common objects is updated, this information is provided to each of the perspectives in which the object is included. Additionally, if one of the common objects is impacted by an update to another object that is not common to multiple perspectives, this information may be provided to the perspectives that include the impacted common object. For instance, if there is an update to object 1040 in perspective 1030, and this change impacts related object 1050, perspective 1020 will be notified of the change to object 1040, even though object 1040 is not included in perspective 1020.

The system may create a connectivity graph between intersection objects. To determine if paths exist between perspectives, it is only necessary to determine the paths between the objects in the intersection lists. As indicated above, intersections may be based on environmental or componentry relationships. These relationships may be used to form map entries for use in graphical mapping of the relationships for display to users. These maps may include either environmental or componentry relationships.

There are a number of visualizations that are supported by the perspectives implementation. In addition to a default perspective view (e.g., the relationship diagram of FIGS. 8A-8B which show a perspective object named "Finale," IT objects in the perspective "Finale," and how they are related) and a three-way view (e.g., the Venn diagram of FIG. 10A which shows the potential impact of a change "SQL Service Pack install" on sets of objects in three different perspectives 1010, 1020, and 1030), the system may provide perspective graph views, dynamic search views, and heat-map views. Perspective graph views show how perspectives are linked together through intersection objects. These views can be used to show higher-level impact analysis type data (to show how a change to an object affects perspectives that do and do not include the object). Dynamic search views show the results of relationship based searches. One example of such a view is an incident analysis view, in which all objects within X degrees of selected objects are searched, and changes, incident, problem objects are returned. The view shows the returned objects and the paths connecting them. One special case of this type of view is a "heat-map" view, in which the counts of changes, incidents and problems are used to annotate each object in the view. This annotation is the "heat" of the heat-map. As an alternative to a numeric annotation, the "heat" can be shown as an aura around each object which gets "hotter" the higher the count. The count may be a raw count, or it may be weighted according to the severity or impact of the changes, incidents and problems.

A relationship based search feature may be used as the basis of many other features. The relationship based search is a mechanism for searching for objects that also takes into account the relationships between objects. An example would be to find all objects within 2 degrees of object Y. This would find all objects connected directly to Y and all objects directly connected to the objects directly connected to Y. A more complex example would be to find all objects with names containing "XYZ" which are within 3 degrees of object A along "connected to" relationships". This would find all objects matching the specified filter within 3 hops of object A and each object returned would be transitively connected to A with a "connected to" relationship. Since relationships can themselves be social IT objects, embodiments can also allow searching for relationships. An example for a relationship search would be to find all "Connected To" relationships where the "Connection Speed" is "<1 GB". This would be useful for finding slow connections in the environment, for example. As such, a user can specify whether to output a list of objects, or a list of relationships. Furthermore, in addition to adding attributes to objects, a user can also add custom attributes to relationships. Most configuration management systems (e.g., CMDBs) only allow searches across objects and their attributes—adding the extra dimension of relationships by embodiments disclosed herein is therefore extremely powerful.

In one embodiment, a relationship based search can contain the following parts:

Starting Object/s Selector—the criteria for selecting the starting object. This can be based on object type (e.g., all network devices), a specific object (e.g., object houdb01), or a result of a traditional search (e.g., all objects containing HOU in their names).

Object Selector—the criteria by which objects are included in the result. This can be different from the Starting Object Selector. Additionally, a "Tag" Selector may be provided to allow objects to be selected based on whether they have specific tags.

Relationship Selector—the criteria by which the relationships are selected when traversing the graph (e.g., all relationship types, or list of relationships in a list). The maximum depth for each relationship type can also be provided. In addition to relationship types, the actual instances of relationships can also be explored (e.g., traverse using "connected to" relationships when the one side of the relationship is a "network device object" or a "computer called foobar").

Perspective Selector—allows the search to be restricted to specific perspectives instead of based on the entire universe of objects. Perspectives can be selected by name or by owner.

Enumeration Selector—indicates how the result is to be returned. Results can be ordered, grouped by type, grouped by relationship type, or aggregated.

It should be noted that the use of perspectives can guide the search. Searching for objects within perspectives (one, multiple, or all), filters out those abandoned objects that exist in the data store but are not referenced by anyone's perspectives. This is a powerful noise removal mechanism and allows higher level functionality built around perspectives to be tightly linked to the people that care about specific sets of objects. For example, determining the people who should be notified about a change, or determining the changes that might have caused an incident are all significantly enhanced when perspectives are taken into account.

Figure 11:
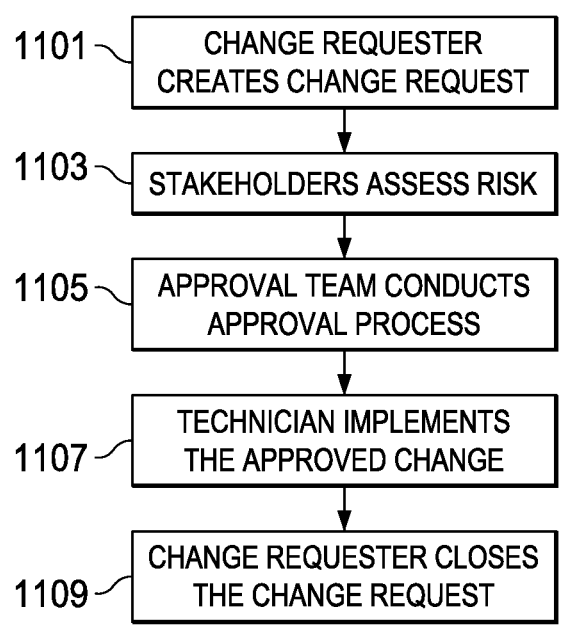
FIG. 11 depicts a flow diagram illustrating an example method for change management using perspectives.

To further illustrate this point, FIG. 11 depicts an example flow diagram of a process flow for managing a change using perspectives. At step 1101, a user (referred to as a change requester) may create a change request via a change management module or system (e.g., change management 362 of FIG. 3). Suppose the requested change is related to an exchange application. Each stakeholder such as the owner of the exchange application may perform an impact analysis and review impact factors of the exchange application to assess the risk posed by the requested change (step 1103). If the stakeholders find the risk acceptable, an approval team may conduct an approval process (step 1105) and cause the approved change to be implemented (step 1107). After the change is made, the change requester may then close the change request (step 1109). This process is further explained below with reference to FIGS. 12-17.

Figure 12A:
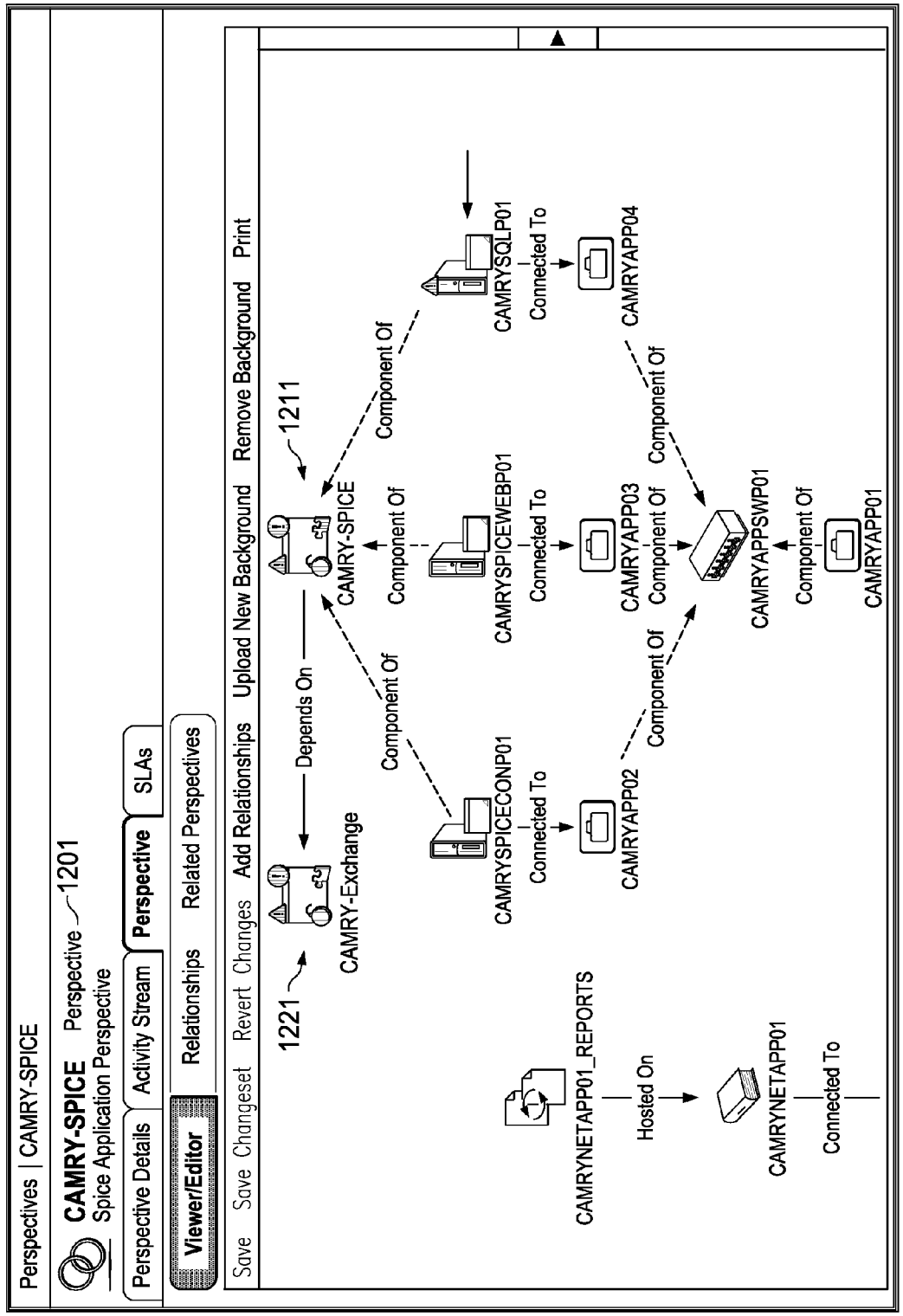
FIGS. 12A-12B depict diagrammatic representations of an example user interface showing two views of an example perspective object.

FIGS. 12A-12B, 13, and 14 depict diagrammatic representations of example user interfaces showing views of three different perspectives (objects 1201, 1301, and 1401). These perspectives may be created using a perspective management module or system (e.g., perspective management 360 of FIG. 3). The perspective management system may implement a perspective editor, an object browser, a relationship based search, or any combination thereof. FIG. 12A shows an example perspective viewer/editor. Notice in FIGS. 12A-14, each of IT objects 1211 and 1221 is shown in a "heat-map" view with color-coded symbols or icons representing the status of changes, incidents, problems, and alerts. Although not shown, different colors may represent different "temperatures" of the "heat" associated with each status type.

Figure 12B:
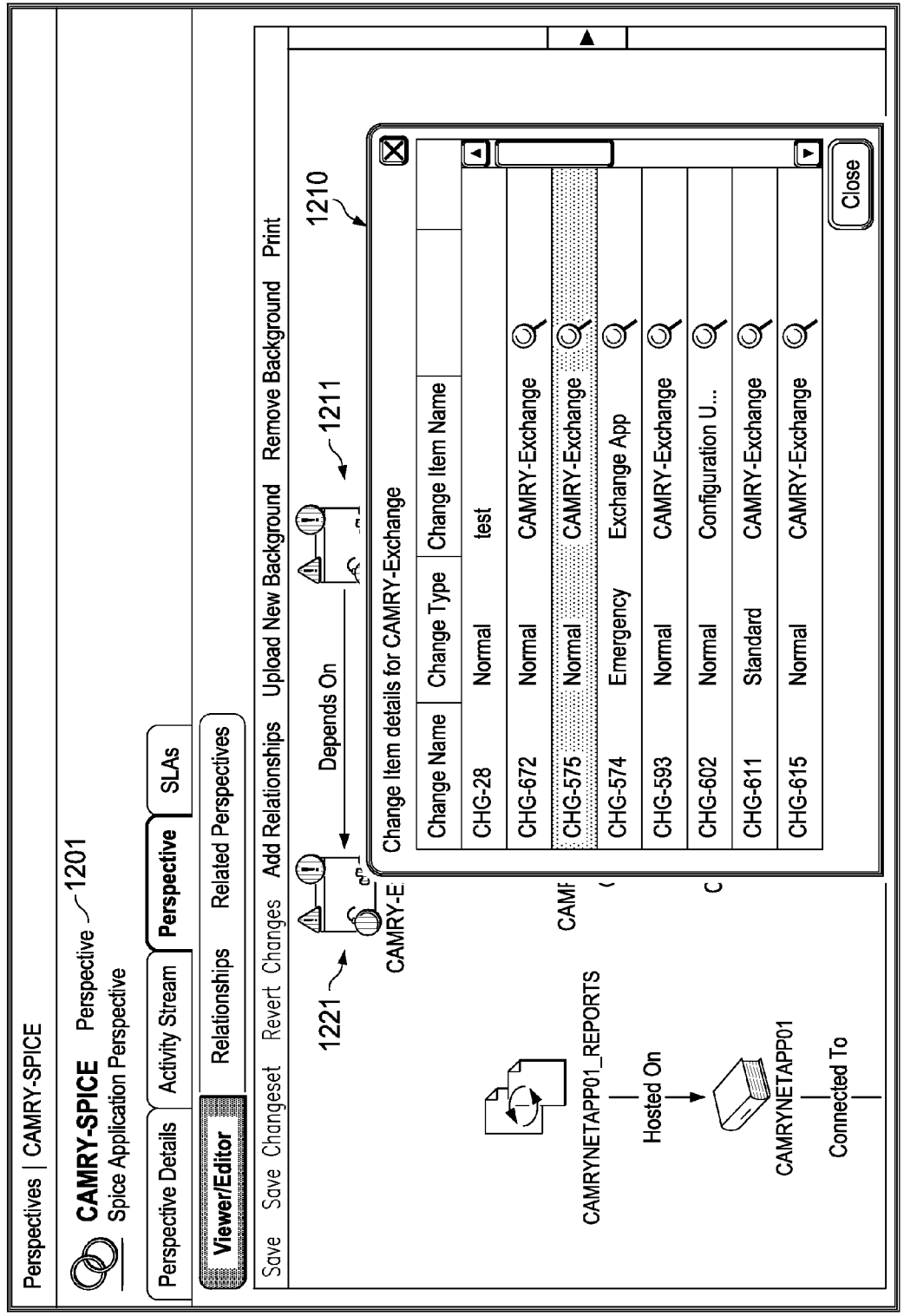
Figure 13:
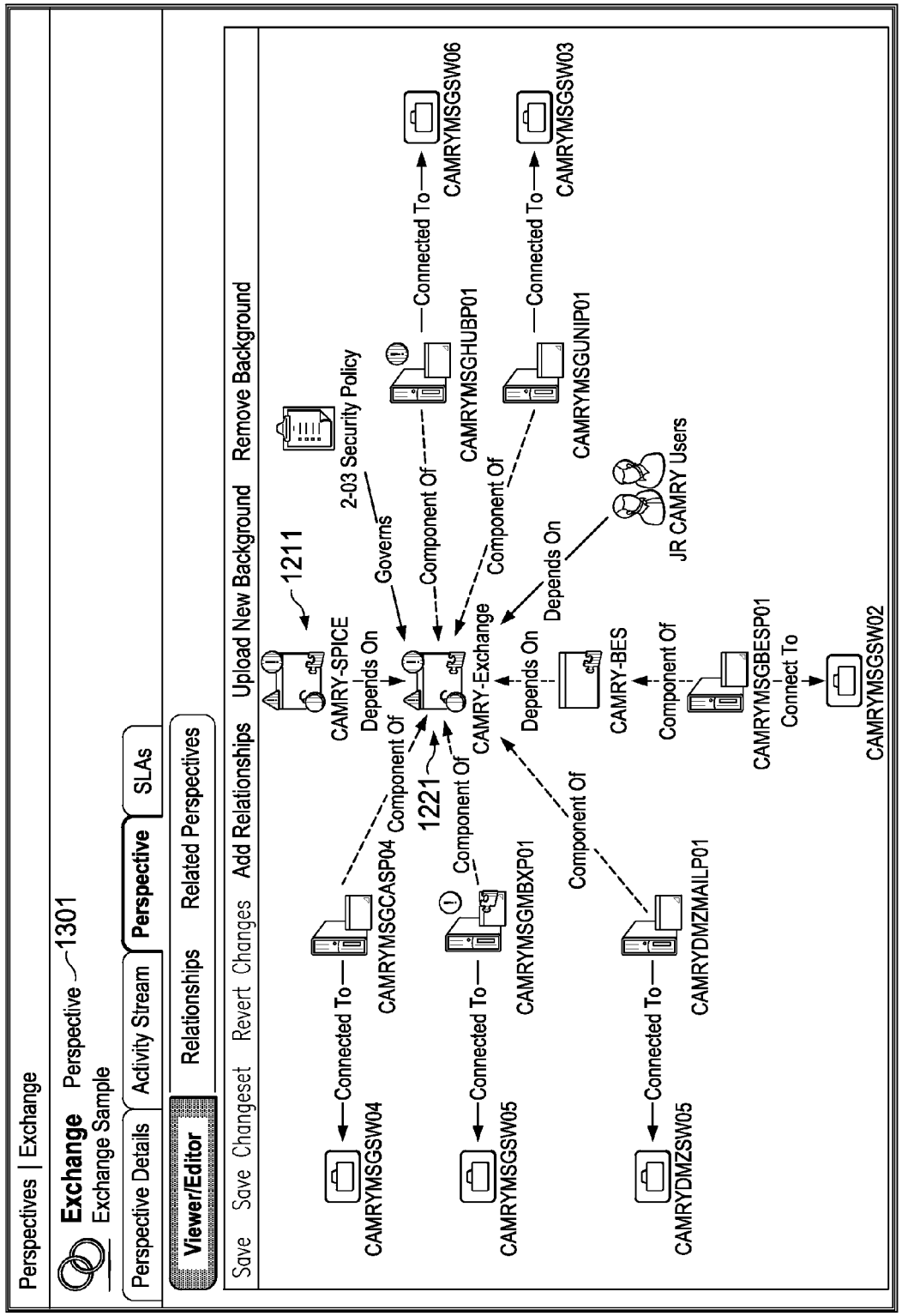
FIG. 13 depicts a diagrammatic representation of an example user interface showing a view of an example perspective object.
Figure 14:
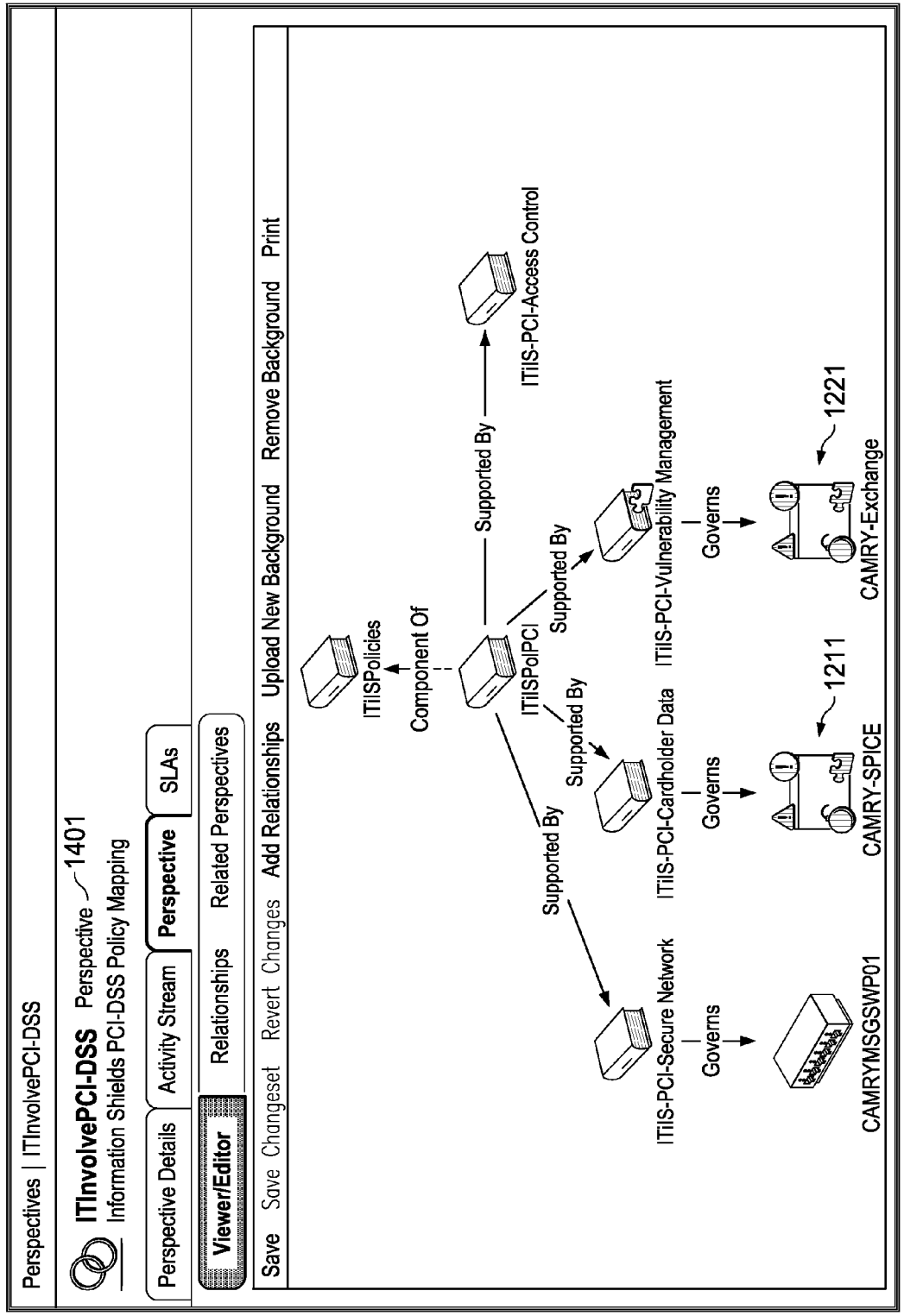
FIG. 14 depicts a diagrammatic representation of an example user interface showing a view of an example perspective object.

Each perspective thus created defines a set of IT objects and provides a mechanism for bringing many object relationships into a personalized view. In this example, at least two IT objects "CAMRY-SPICE" 1211 and "CAMRY-Exchange" 1221 are included in all three perspectives 1201, 1301, and 1401. As illustrated in FIG. 12B, when an IT object in a perspective is selected, popup window 1210 may display pending changes for the selected IT object.

It can be seen from FIGS. 12A-14, each perspective not only shows a specific set of objects, but it also shows these objects from a unique perspective. For example, perspective 1201 may be created to capture a set of objects and their relationships from the perspective of IT object 1211, which is of an application object type. Thus, perspective 1201 may provide a view showing application components of IT object 1211 and how those application components are related to other application objects, with a mention that IT object 1211 depends on IT object 1221 which represents an exchange "CAMRY-Exchange." However, perspective 1301 may be created to capture a set of objects and their relationships from the perspective of the exchange. Thus, perspective 1301 may provide a view showing IT object 1221 in the center and IT object 1211 as one of the many IT objects related to IT object 1221. Meanwhile, perspective 1401 may be created to capture a set of objects and their relationships from the perspective of policy mapping and merely lists IT objects 1211 and 1221 as those governed by certain policies. Since the same IT object in different perspectives may have different levels of importance with respect to other IT objects in the perspectives, its impact may also differ from perspective to perspective.

Figure 15A:
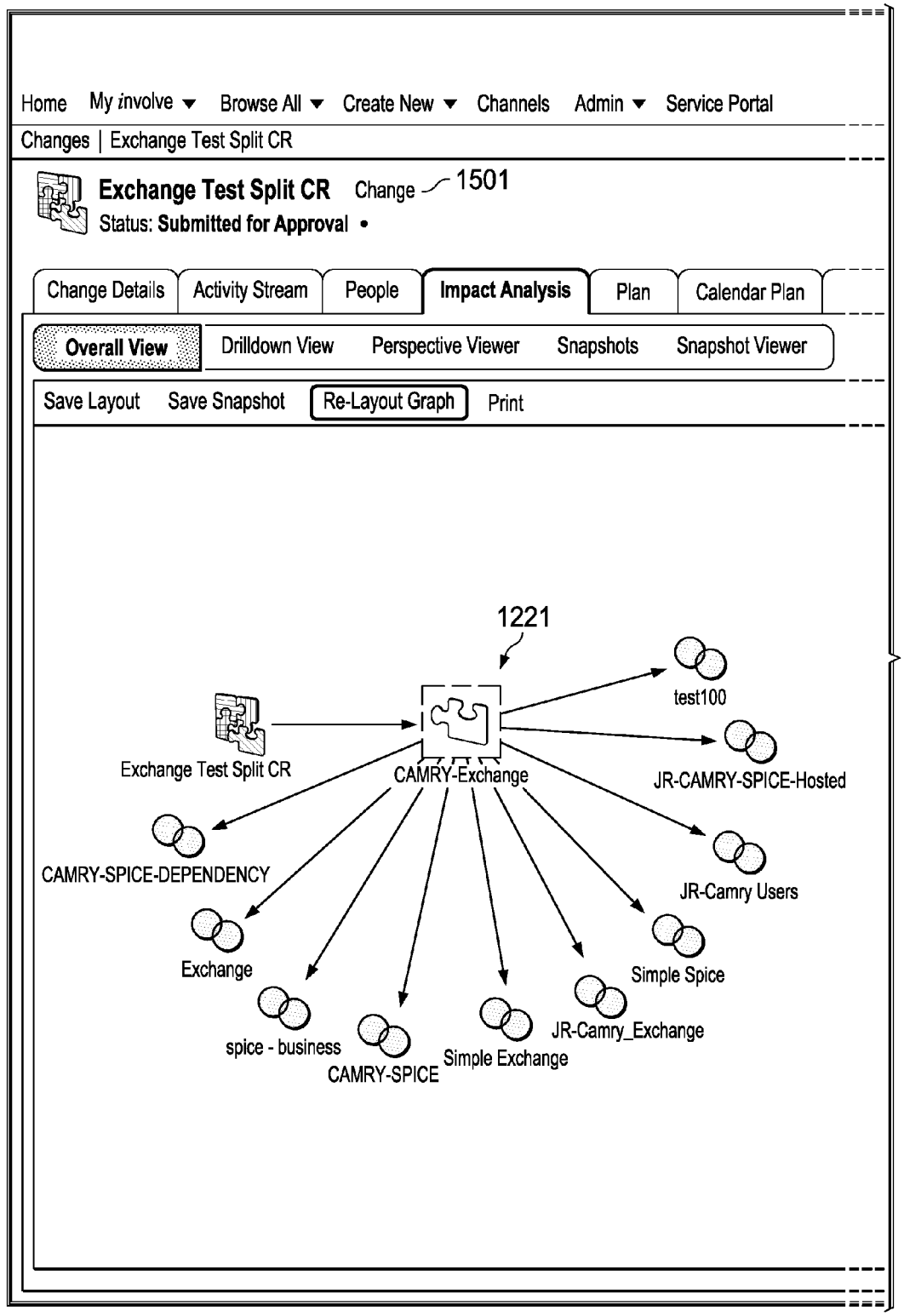
Figure 15B:
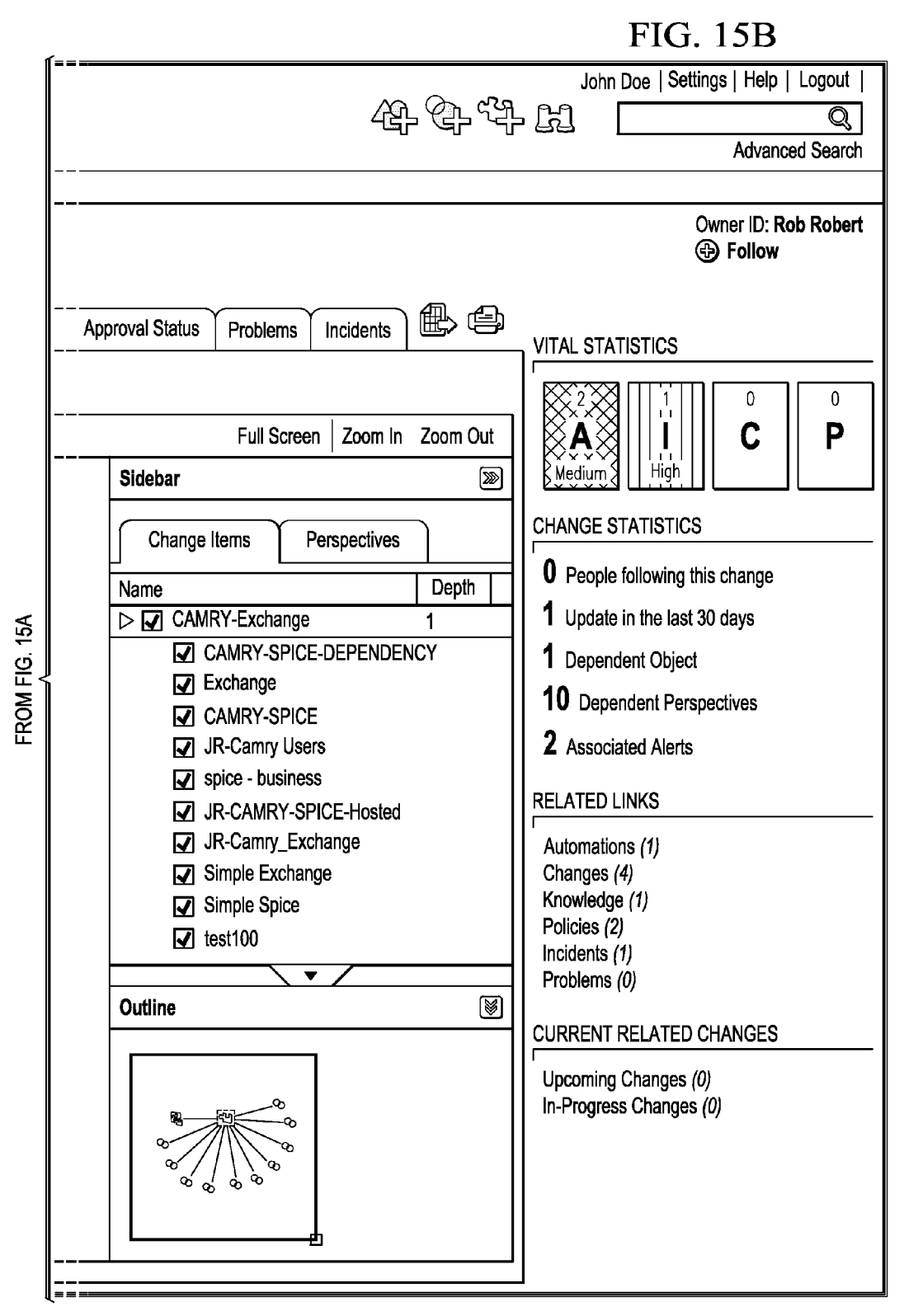

FIGS. 15A-15B depict a diagrammatic representation of an example user interface showing a view of an impact analysis with respect to a change 1501. In this example, change 1501 is related to IT object 1221 "CAMRY-Exchange" which is in multiple perspectives including perspectives 1201, 1301, and 1401. When change 1501 is first created, the system may operate to evaluate IT object 1221, evaluate its associated object relationships, determine what activity streams need to be updated (e.g., all relevant impacts), and proceed to do so automatically. In determining what activity streams need to be updated, the system may follow the relationships of each IT object involved. Again, perspectives are IT objects themselves, so this process includes the perspectives and objects contained therein.

Figure 16:
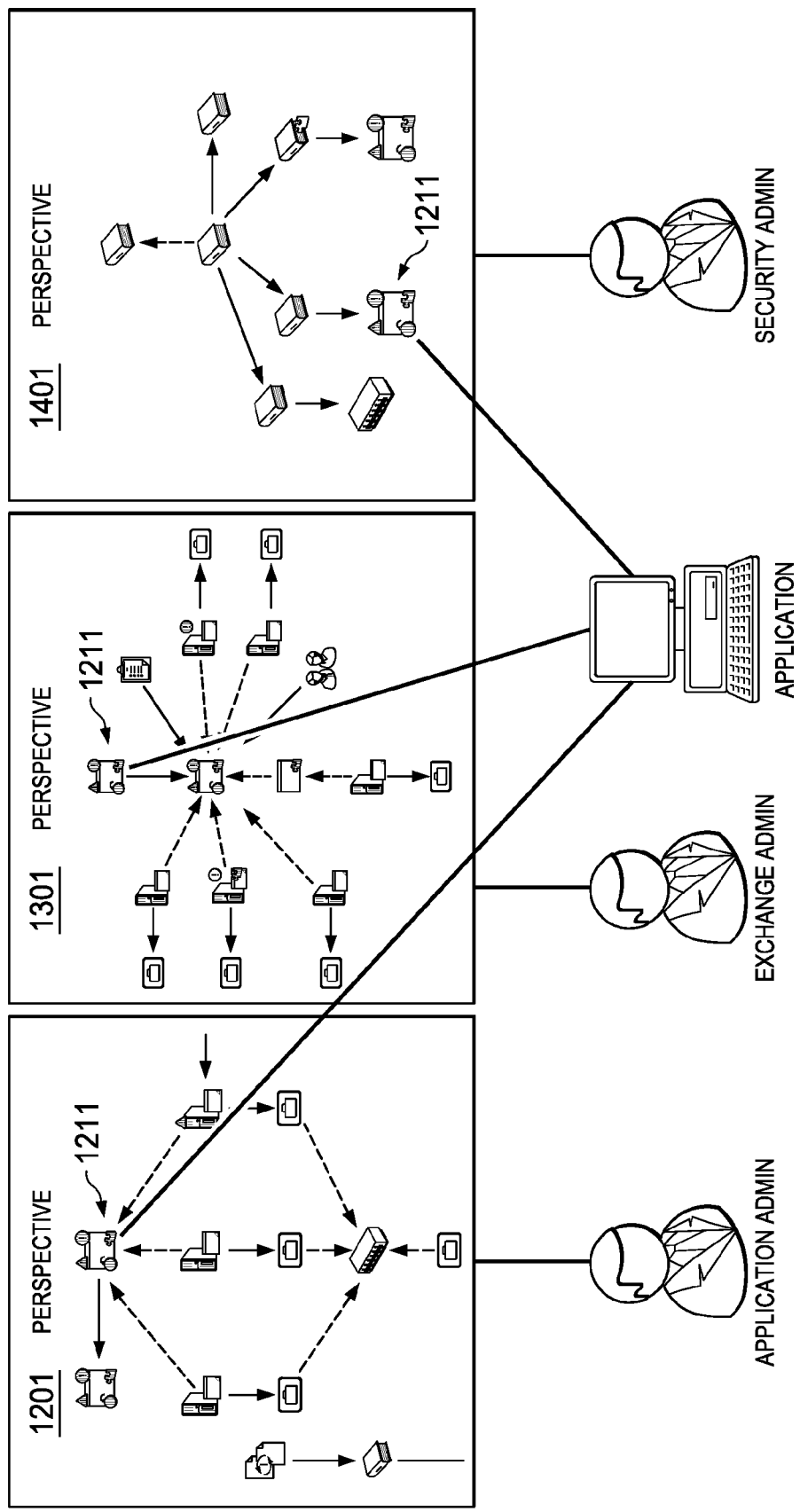
FIG. 16 depicts a diagram illustrating the same IT object relating to different sets of IT objects in different perspectives.

FIG. 16 depicts a diagram further illustrating the same IT object (e.g., IT object 1211) relating to different sets of IT objects in different perspectives. As illustrated in this example, perspective 1201 may be created by an application administrator, perspective 1301 may be created by an exchange administrator, and perspective 1401 may be created by a security administrator. These administrators have different perspectives relative to the same application represented by IT object 1211. Thus, they may analyze differently the impact of a change (e.g., change 1501), incident, problem, request, or the like, relative to the same IT object and weight differently the risk posed thereby.

After looking at the impact to their perspective, an administrator may update their weigh in position (e.g., accept the risk) for the change. The system automatically generates a post about the update and posts it in the associated activity stream for the change.

In one embodiment, an administrator may choose what to include in the activity stream of a perspective that they created/own. For example, in addition to showing a change to an IT object in a perspective, the activity stream of the perspective may be configured to show a change to the perspective itself.

Figure 17B:
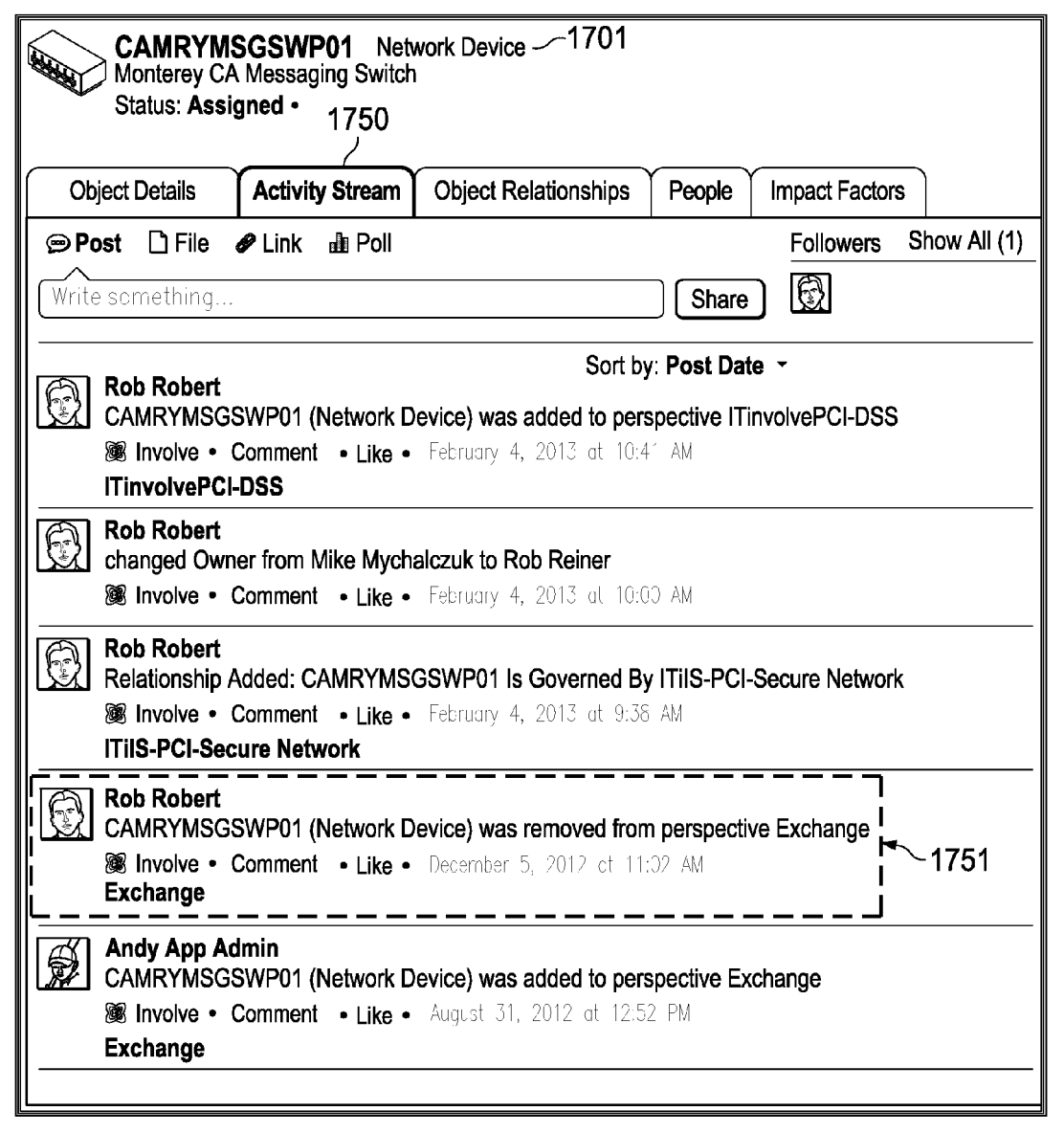

FIGS. 17A-17B depict an example showing that a change to a perspective concerning an IT object is reflected in both the perspective's activity stream and the IT object's activity stream. In this example a network device "CAMRYMSGSWP01" was removed from perspective 1301, thereby changing perspective 1301. This change is reflected in post 1751 which is automatically generated by the system and placed in activity stream 1750 of the network device represented by IT object 1701. The system also automatically generates post 1351 about the removal of IT object 1701 from perspective 1301 and places post 1351 in activity stream 1350 of perspective 1301. Since a perspective may include objects that are not directly related to each other, this allows even those who do not directly follow a certain IT object (e.g., IT object 1701) to comment on the change relevant to the IT object by posting a comment on the system generated post (e.g., post 1351) in the activity stream of the perspective involved in the change.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for information technology (IT) services and social knowledge management using perspectives, comprising:
   receiving, by a perspective management system via a user interface, an instruction from a user to build a perspective;
   instantiating an IT object and an activity stream, the IT object representing the perspective, the instantiating performed by the perspective management system running on one or more server machines in the IT environment;
   responsive to a specific IT object in the IT environment being selected via the user interface, performing a relationship based search in which IT objects within a certain degree of the selected specific IT object are searched and presented on the user interface;
   responsive to an invocation of a function via the user interface, adding a set of IT objects currently presented on the user interface into the perspective such that the set of IT objects in the perspective represents a portion of the IT environment that is uniquely of interest to a group or the user, the activity stream configured for capturing communications, notifications, and knowledge relating to the set of IT objects, enabling collaboration between users, and facilitating entry and maintenance of information associated with the set of IT objects, each physical or non-physical object in the IT environment represented by an IT object, the each IT object in the IT environment having a one-to-one relationship with an associated activity stream configured for capturing communications, notifications, and knowledge related to the each IT object, the associated activity stream instantiated when the each IT object was created;
   storing the IT object representing the perspective in an object store, the object store storing perspectives of the IT environment, each perspective of the perspectives having an associated activity stream instantiated when the each perspective was created;
   in response to a request from a client device communicatively connected to the one or more server machines over a network, the perspective management system initiating a change request, the change request relating to a requested change to one or more IT objects in the IT environment;
   in response to an impact analysis request from a client device communicatively connected to the one or more server machines over a network, the perspective management system constructing a graphical view for display on the client device showing a potential impact of the change request on IT objects in one or more perspectives of the perspectives; and
   in response to an approval of the change request to make the requested change to the one or more IT objects in the IT environment, the perspective management system automatically generating a post about the approval of the change request and placing the post in an activity stream of a perspective of the perspectives.

2. The method according to claim 1, further comprising:
   in response to a change to a perspective, automatically updating the activity stream of the perspective about the change to the perspective.

3. The method according to claim 2, wherein the change to the perspective is caused by application of a relationship rule to a specific part of the perspective.

4. The method according to claim 1, further comprising:
   in response to a change to an IT object in a perspective, automatically updating the activity stream of the IT object and the activity stream of the perspective about the change to the IT object.

5. The method according to claim 1, wherein at least two of the perspectives overlap.

6. The method according to claim 1, wherein at least one perspective of the perspectives is built using a relationship based search in which all objects within a certain degree of a selected object are searched and pulled into the at least one perspective.

7. A computer program product comprising at least one non-transitory computer readable medium storing instructions translatable by one or more server machines to perform:
   receiving by a perspective management system via a perspective editor having a user interface, an instruction from a user to build a perspective;
   instantiating an IT object and an activity stream, the IT object representing the perspective in an IT environment;
   responsive to a specific IT object in the IT environment being selected via the user interface, performing a relationship based search in which IT objects within a certain degree of the selected specific IT object are searched and presented on the user interface;
   responsive to an invocation of a function via the user interface, adding a set of IT objects currently presented on the user interface into the perspective such that the set of IT objects in the perspective represents a portion of the IT environment that is uniquely of interest to a group or the user, the activity stream configured for capturing communications, notifications, and knowledge relating to the set of IT objects, enabling collaboration between users, and facilitating entry and maintenance of information associated with the set of IT objects, each physical or non-physical object in the IT environment represented by an IT object, each IT object in the IT environment having a one-to-one relationship with an associated activity stream configured for capturing communications, notifications, and knowledge related to the each IT object, the associated activity stream instantiated when the each IT object was created;
   storing the each IT object representing the perspective in an object store, the object store storing perspectives of the IT environment, each perspective of the perspectives having an associated activity stream instantiated when the each perspective was created;
   in response to a request from a client device communicatively connected to the one or more server machines over a network, the perspective management system initiating a change request, the change request relating to a requested change to one or more IT objects in the IT environment;
   in response to an impact analysis request from a client device communicatively connected to the one or more server machines over a network, constructing a graphical view for display on the client device showing a potential impact of the change request on IT objects in one or more of the perspectives of the perspectives; and
   in response to an approval of the change request to make the requested change to the one or more IT objects in the IT environment, the perspective management system automatically generating a post about the approval of the change request and placing the post in an activity stream of a perspective of the perspectives.

8. The computer program product of claim 7, wherein the instructions are further translatable by the one or more server machines to perform:
  in response to a change to a perspective, automatically updating the activity stream of the perspective about the change to the perspective.

9. The computer program product of claim 8, wherein the change to the perspective is caused by application of a relationship rule to a specific part of the perspective.

10. The computer program product of claim 7, wherein the instructions are further translatable by the one or more server machines to perform:
  in response to a change to an IT object in a perspective, automatically updating the activity stream of the IT object and the activity stream of the perspective about the change to the IT object.

11. The computer program product of claim 7, wherein at least two of the perspectives overlap.

12. The computer program product of claim 7, wherein at least one perspective of the perspectives is built using a relationship based search in which all objects within a certain degree of a selected object are searched and pulled into the at least one perspective.

13. A system for information technology (IT) services and social knowledge management using perspectives, comprising:
  a data storage device storing IT objects representing physical and non-physical objects in the IT environment, with each IT object of the IT objects representing one of the physical and non-physical objects in the IT environment, the physical objects including animate and non-animate objects; and
  one or more server machines communicatively connected to the data storage device, the one or more server machines executing a perspective management system configured for:
    receiving, by a perspective management system via a perspective editor having a user interface, an instruction from a user to build a perspective;
    instantiating an IT object and an activity stream, the IT object representing the perspective in the IT environment;
    responsive to a specific IT object in the IT environment being selected via the user interface, performing a relationship based search in which IT objects within a certain degree of the selected specific IT object are searched and presented on the user interface;
    responsive to an invocation of a function via the user interface, adding a set of IT objects currently presented on the user interface into the perspective such that the set of IT objects in the perspective represents a portion of the IT environment that is uniquely of interest to a group or the user, the activity stream configured for capturing communications, notifications, and knowledge relating to the set of IT objects, enabling collaboration between users, and facilitating entry and maintenance of information associated with the set of IT objects, each physical or non-physical object in the IT environment represented by an IT object, the each IT object having a one-to-one relationship with an associated activity stream configured for capturing communications, notifications, and knowledge related to the each IT object, the associated activity stream instantiated when the each IT object was created;
    storing the IT object representing the perspective in an object store, the object store storing perspectives of the IT environment, each perspective of the perspectives having an associated activity stream instantiated when the each perspective was created;
    in response to a request from a client device communicatively connected to the one or more server machines over a network, the perspective management system initiating a change request, the change request relating to a requested change to one or more IT objects in the IT environment;
    in response to an impact analysis request from a client device communicatively connected to the one or more server machines over a network, constructing a graphical view for display on the client device showing a potential impact of the change request on IT objects in one or more of the perspectives of the perspectives; and
    in response to an approval of the change request to make the requested change to the one or more IT objects in the IT environment, the perspective management system automatically generating a post about the approval of the change request and placing the post in an activity stream of a perspective of the perspectives.

14. The system of claim 13, wherein in response to a change to a perspective, the activity stream of the perspective is automatically updated to reflect the change to the perspective.

15. The system of claim 14, wherein the change to the perspective is caused by application of a relationship rule to a specific part of the perspective.

16. The system of claim 14, wherein the change to the perspective is caused by removal of an object from the perspective or addition of an object to the perspective.

17. The system of claim 13, wherein in response to a change to an IT object in a perspective, the activity stream of the IT object and the activity stream of the perspective are automatically updated to reflect the change to the IT object in the perspective.

18. The system of claim 13, wherein at least two of the perspectives overlap.

19. The system of claim 13, wherein at least one perspective of the perspectives is built using a relationship based search in which all objects within a certain degree of a selected object are searched and pulled into the at least one perspective.

20. The system of claim 13, wherein each perspective of the perspectives is an IT object having an activity stream configured for capturing communications, notifications, and knowledge related to the perspective.

* * * * *